US012560449B2

(12) United States Patent (10) Patent No.: US 12,560,449 B2
Yuan et al. (45) Date of Patent: Feb. 24, 2026

(54) NAVIGATION METHOD, APPARATUS, AND SYSTEM

(71) Applicant: Shenzhen Yinwang Intelligent Technologies Co., Ltd., Shenzhen (CN)

(72) Inventors: Fang Yuan, Shenzhen (CN); Jinbo Li, Shanghai (CN); Jinan Leng, Hangzhou (CN); Nan Zhong, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 18/324,435

(22) Filed: May 26, 2023

(65) Prior Publication Data

US 2023/0304823 A1 Sep. 28, 2023

Related U.S. Application Data

(63) Continuation of application No. PCT/CN2020/132390, filed on Nov. 27, 2020.

(51) Int. Cl.
| | |
|---|---|
| *G01C 21/36* | (2006.01) |
| *G06V 20/58* | (2022.01) |
| *G08G 1/14* | (2006.01) |

(52) U.S. Cl.
CPC ......... *G01C 21/3685* (2013.01); *G06V 20/58* (2022.01); *G08G 1/143* (2013.01)

(58) Field of Classification Search
CPC ............ G01C 21/3685; G01C 21/3407; G06V 20/58; G06V 20/52; G08G 1/143; G08G 1/149; G08G 1/005; G08G 1/0112; G08G 1/04; G08G 1/168; G08G 1/142; G08G 1/146; G08G 1/165; G08G 1/205;
(Continued)

(56) References Cited

U.S. PATENT DOCUMENTS

| 6,031,935 A | * | 2/2000 | Kimmel | .................. | G06T 7/149 |
| | | | | | 382/199 |
| 7,600,689 B2 | * | 10/2009 | Tsikos | .................. | G02B 19/009 |
| | | | | | 235/462.43 |

(Continued)

FOREIGN PATENT DOCUMENTS

| CN | 105551301 A | 5/2016 |
|---|---|---|
| CN | 109087525 A | 12/2018 |

(Continued)

OTHER PUBLICATIONS

CN-109410623-A machine translation (Year: 2019).*

*Primary Examiner* — Angelina M Shudy
(74) *Attorney, Agent, or Firm* — Conley Rose, P.C.

(57) ABSTRACT

A navigation method in the field of intelligent driving technologies includes obtaining images shot by a plurality of cameras; obtaining location information of a target vehicle based on the images shot by the plurality of cameras; after a target parking space for parking the target vehicle is determined, generating a navigation route based on the location information of the target vehicle and location information of the target parking space; and sending the navigation route to a terminal device such that a safety condition in the parking lot can be predicted to assist in safe driving of the target vehicle.

20 Claims, 17 Drawing Sheets

(58) Field of Classification Search

CPC .... G08G 1/144; G08G 1/148; B62D 15/0285;
G05D 1/00; B60W 30/00; B60W 60/00

See application file for complete search history.

(56) References Cited

U.S. PATENT DOCUMENTS

| | | | | |
|---|---|---|---|---|
| 7,688,225 | B1 * | 3/2010 | Haynes | G08G 1/14 |
| | | | | 348/148 |
| 7,783,530 | B2 * | 8/2010 | Slemmer | G06Q 30/0633 |
| | | | | 705/28 |
| 9,129,524 | B2 * | 9/2015 | Delibaltov | G06F 18/2411 |
| 9,761,139 | B2 * | 9/2017 | Acker, Jr. | B62D 15/028 |
| 9,939,287 | B2 * | 4/2018 | Castellucci | G01C 21/3476 |
| 10,467,894 | B2 * | 11/2019 | Neumayer | G08B 7/066 |
| 10,482,766 | B2 * | 11/2019 | Mowatt | G08G 1/146 |
| 10,580,300 | B1 * | 3/2020 | Rosenblatt | G08G 1/144 |
| 11,619,512 | B1 * | 4/2023 | Gupta | G06F 3/14 |
| | | | | 345/589 |
| 11,745,727 | B2 * | 9/2023 | Sonalker | B60W 30/06 |
| | | | | 701/23 |
| 12,235,113 | B2 * | 2/2025 | Ogata | B60W 30/06 |
| 12,264,935 | B2 * | 4/2025 | Sharifi | G08G 1/148 |
| 12,315,261 | B1 * | 5/2025 | Blanchard | G06T 7/11 |
| 2002/0171562 | A1 * | 11/2002 | Muraki | G08G 1/14 |
| | | | | 340/988 |
| 2005/0196034 | A1 * | 9/2005 | Hattori | G06V 10/147 |
| | | | | 382/104 |
| 2005/0207876 | A1 * | 9/2005 | Springwater | E04H 6/24 |
| | | | | 414/231 |
| 2006/0220911 | A1 * | 10/2006 | Jaupitre | G08G 1/14 |
| | | | | 340/932.2 |
| 2008/0136674 | A1 * | 6/2008 | Jang | G08G 1/14 |
| | | | | 340/932.2 |
| 2010/0026712 | A1 * | 2/2010 | Aliprandi | G06T 15/20 |
| | | | | 345/629 |
| 2010/0066515 | A1 * | 3/2010 | Shimazaki | H04N 7/18 |
| | | | | 701/41 |
| 2010/0156672 | A1 * | 6/2010 | Yoo | B62D 15/0285 |
| | | | | 340/436 |
| 2010/0329513 | A1 * | 12/2010 | Klefenz | G06T 7/73 |
| | | | | 348/148 |
| 2011/0311130 | A1 * | 12/2011 | Ichimori | G06T 7/70 |
| | | | | 382/154 |
| 2012/0143491 | A1 * | 6/2012 | Cheng | G01C 21/3476 |
| | | | | 701/410 |
| 2012/0188100 | A1 | 7/2012 | Min et al. | |
| 2012/0299749 | A1 * | 11/2012 | Xiao | G08G 1/148 |
| | | | | 340/932.2 |
| 2012/0326893 | A1 * | 12/2012 | Glezerman | G08G 1/148 |
| | | | | 340/932.2 |
| 2013/0010103 | A1 * | 1/2013 | Ihara | G06Q 30/06 |
| | | | | 348/116 |
| 2013/0057686 | A1 * | 3/2013 | Genc | G08G 1/0141 |
| | | | | 348/148 |
| 2013/0071012 | A1 * | 3/2013 | Leichsenring | G06T 19/00 |
| | | | | 382/154 |
| 2014/0176348 | A1 * | 6/2014 | Acker, Jr. | G08G 1/04 |
| | | | | 340/932.2 |
| 2014/0198184 | A1 * | 7/2014 | Stein | H04N 23/69 |
| | | | | 348/47 |
| 2014/0266805 | A1 * | 9/2014 | Tippelhofer | G08G 1/148 |
| | | | | 340/932.2 |
| 2015/0006075 | A1 * | 1/2015 | Rad | G08G 1/147 |
| | | | | 701/540 |
| 2015/0138001 | A1 * | 5/2015 | Davies | G08G 1/146 |
| | | | | 340/932.2 |
| 2015/0170518 | A1 * | 6/2015 | Rodriguez Garza | G08G 1/144 |
| | | | | 340/932.2 |
| 2015/0350846 | A1 * | 12/2015 | Chen | G01S 5/16 |
| | | | | 455/456.1 |
| 2016/0180712 | A1 * | 6/2016 | Rosen | G08G 1/147 |
| | | | | 705/5 |
| 2016/0189545 | A1 * | 6/2016 | York | G06Q 10/04 |
| | | | | 701/414 |
| 2017/0061508 | A1 * | 3/2017 | Sen | G06Q 20/20 |
| 2017/0084038 | A1 * | 3/2017 | Dane | G06T 7/20 |
| 2017/0200320 | A1 * | 7/2017 | Tomer | G07B 15/00 |
| 2017/0263124 | A1 | 9/2017 | Li | |
| 2017/0292854 | A1 * | 10/2017 | Zhang | G05D 1/0088 |
| 2017/0337434 | A1 * | 11/2017 | Cui | G06V 20/58 |
| 2017/0358103 | A1 * | 12/2017 | Shao | G01S 3/00 |
| 2018/0033244 | A1 | 2/2018 | Northrup et al. | |
| 2018/0039280 | A1 * | 2/2018 | Lee | G05D 1/0274 |
| 2018/0095474 | A1 * | 4/2018 | Batur | G01S 13/867 |
| 2018/0114437 | A1 * | 4/2018 | Singh | G08G 1/015 |
| 2018/0129218 | A1 * | 5/2018 | Kato | G08G 1/143 |
| 2018/0176483 | A1 * | 6/2018 | Knorr | H04N 5/2723 |
| 2018/0301031 | A1 * | 10/2018 | Naamani | G01C 21/3685 |
| 2018/0307922 | A1 * | 10/2018 | Yoon | G06T 7/55 |
| 2018/0313661 | A1 * | 11/2018 | Eyster | G08G 1/144 |
| 2019/0066502 | A1 * | 2/2019 | Du | G08G 1/142 |
| 2019/0145891 | A1 * | 5/2019 | Waxman | G01N 21/3504 |
| | | | | 356/409 |
| 2019/0283736 | A1 * | 9/2019 | Watanabe | B60W 30/06 |
| 2019/0287400 | A1 * | 9/2019 | Cao | G08G 1/142 |
| 2019/0325595 | A1 * | 10/2019 | Stein | G06T 7/55 |
| 2020/0074859 | A1 * | 3/2020 | Eshima | B62D 15/0285 |
| 2020/0117926 | A1 | 4/2020 | Kim | |
| 2020/0207338 | A1 * | 7/2020 | Cho | B62D 15/0285 |
| 2020/0209886 | A1 * | 7/2020 | Lee | G01S 17/931 |
| 2020/0304802 | A1 * | 9/2020 | Habibian | G06V 10/764 |
| 2020/0309541 | A1 * | 10/2020 | Lavy | G06V 20/588 |
| 2020/0311849 | A1 * | 10/2020 | Noguchi | G06Q 10/02 |
| 2020/0406888 | A1 * | 12/2020 | Hamai | B60W 10/20 |
| 2021/0021802 | A1 * | 1/2021 | Devitt | H04N 13/106 |
| 2021/0316789 | A1 * | 10/2021 | Kamiyama | B60R 1/27 |
| 2022/0011125 | A1 * | 1/2022 | Ge | G08G 1/096883 |
| 2022/0051425 | A1 * | 2/2022 | Busam | G06T 3/40 |
| 2022/0138889 | A1 * | 5/2022 | Higuchi | G06Q 50/40 |
| | | | | 705/13 |
| 2022/0153262 | A1 * | 5/2022 | Gallo | G01S 7/417 |
| 2022/0237866 | A1 * | 7/2022 | Stein | G06T 7/292 |
| 2022/0254045 | A1 * | 8/2022 | Boardman | H04N 23/695 |
| 2022/0319321 | A1 * | 10/2022 | Takanohashi | G08G 1/141 |
| 2023/0005277 | A1 * | 1/2023 | Ge | G06V 20/586 |
| 2023/0274552 | A1 * | 8/2023 | Julien | G08B 13/19647 |
| | | | | 348/143 |
| 2024/0183963 | A1 * | 6/2024 | Swierczynski | G06T 7/593 |
| 2024/0257641 | A1 * | 8/2024 | Iguchi | G08G 1/148 |
| 2024/0404407 | A1 * | 12/2024 | Kimura | G08G 1/145 |
| 2025/0111683 | A1 * | 4/2025 | Nabatame | G06V 20/586 |

FOREIGN PATENT DOCUMENTS

| | | | | |
|---|---|---|---|---|
| CN | 109326136 | A | 2/2019 | |
| CN | 109410623 | A * | 3/2019 | ....... G08G 1/096805 |
| CN | 109584613 | A | 4/2019 | |
| CN | 110390836 | A | 10/2019 | |
| CN | 110634306 | A | 12/2019 | |
| CN | 110706506 | A | 1/2020 | |
| CN | 110871702 | A | 3/2020 | |
| CN | 110930753 | A | 3/2020 | |
| WO | 2020151632 | A1 | 7/2020 | |

* cited by examiner

NAVIGATION METHOD, APPARATUS, AND SYSTEM

CROSS-REFERENCE TO RELATED APPLICATIONS

This application is a continuation application of International Patent Application No. PCT/CN2020/132390, filed on Nov. 27, 2020, which is hereby incorporated by reference in its entirety.

TECHNICAL FIELD

The present application relates to the field of intelligent driving technologies, furthermore, to a navigation method, apparatus, and system.

BACKGROUND

A parking problem is a long-term problem that perplexes many cities. For a place in which there is a large flow of people, for example, an old community, a commercial complex, or a place around a hospital, a phenomenon that a "parking space" is hard to find is more common. Although parking lots are built in many occasions to meet people's parking requirements, people face some common problems after entering the parking lots. For example, after several circles in a parking lot, a parking space still cannot be found, or when a parking space is found, the parking space is occupied by another vehicle.

Currently, although a quantity of parking lots continuously increases, sizes and structures of the parking lots also become more complex. However, an existing parking guidance system is subject to a technical capability (for example, a current reminding means for a vacant parking space is original, because the vacant parking space is basically displayed by using a guidance plate or an indicating light changing colors between green and red above the parking space), and accordingly, a user can only passively obtain local information, and sometimes obtained information is not accurate. Therefore, the user still blindly drives to find a parking space. Therefore, it is very important to rationally allocate various resources, and efficiently and conveniently use parking lots, to fundamentally resolve problems such as it is difficult for a user to find a parking space and park, and improve a turnover rate and a utilization rate of existing parking spaces in a city.

SUMMARY

To resolve the foregoing problem that it is difficult for a driver to find a vacant parking space in a parking lot, embodiments of this application provide a navigation method, apparatus, and system.

According to a first aspect, an embodiment of this application provides a navigation method, including obtaining images shot by a plurality of cameras, where the plurality of cameras are disposed in a parking lot; obtaining location information of a target vehicle based on the images shot by the plurality of cameras; obtaining location information of a first target parking space, where the first target parking space is a vacant parking space for parking the target vehicle; generating a first navigation route based on the location information of the target vehicle and the location information of the first target parking space, where the first navigation route is a navigation route for the target vehicle to reach the first target parking space; and sending the first navigation route to a terminal device, where the terminal device is a navigation device of a user of the target vehicle.

In this implementation, the location information of the target vehicle in the parking lot is obtained by using a camera vision positioning technology; then a vacant target parking space for parking the target vehicle is determined; a navigation route is generated based on the location information of the target vehicle and location information of the target parking space; and finally the navigation route is pushed to a mobile phone of the user. This resolves a problem of finding a parking space by blindly driving a vehicle in the parking lot, thereby improving operating efficiency of an existing parking lot and user experience. In addition, a safety condition in the parking lot can be predicted, to assist in safe driving of the target vehicle.

In an implementation, the method further includes setting a state of the first target parking space from a vacant state to a non-vacant state.

In this implementation, if a ground lock display is disposed on each parking space in the parking lot, after a driver reserves a target parking space, the ground lock on the parking space is raised, or a prompting message indicating that the parking space has been reserved is displayed on the display, thereby avoiding occupation of the parking space by another driver.

In an implementation, the obtaining location information of a target vehicle based on the images shot by the plurality of cameras includes receiving vehicle information of the target vehicle sent by the terminal device; identifying, based on the vehicle information of the target vehicle, a first image from the images shot by the plurality of cameras, where the first image includes the target vehicle; and determining the location information of the target vehicle by using the first image and a stored parking lot map.

In an implementation, the first target parking space is a vacant parking space closest to the target vehicle.

In an implementation, the obtaining location information of a first target parking space includes sending parking space information to the terminal device, where the parking space information is about all vacant parking spaces in the parking lot; and receiving a first instruction sent by the terminal device, where the first instruction indicates the first target parking space selected by the user from all the vacant parking spaces in the parking lot.

In this implementation, a server may send a vacant state, an occupied state, and a reserved state of each parking space in the parking lot to the terminal device, and display a received state on the terminal device, so that the driver can select, based on a wish thereof, a vacant parking space as a parking space for parking. The terminal device sends, to the server, an instruction indicating that the driver reserves a parking space, and the server selects a target parking space based on the received instruction, so that the driver flexibly selects, based on the wish thereof, a wanted parking space.

In an implementation, the method further includes receiving a second instruction sent by the terminal device, where the second instruction indicates that the user reselects a vacant parking space for parking; obtaining location information of a second target parking space, where the second target parking space is a vacant parking space for parking the target vehicle other than the first target parking space; generating a second navigation route based on the location information of the target vehicle and the location information of the second target parking space, where the second navigation route is a navigation route for the target vehicle to reach the second target parking space; and sending the second navigation route to the terminal device.

In this implementation, if a navigation route selected by the server is impassable and does not meet a subjective wish of the driver, the driver may request, by using the terminal device, the server to reselect a navigation route, so that the driver can select a different navigation route to reach the target parking space based on an actual need.

In an implementation, the method further includes detecting whether there is an obstacle on a road in an image shot by a second camera, where the second camera is a camera in the first navigation route; and when it is detected that there is an obstacle on the road in the image shot by the second camera, generating a third navigation route based on the location information of the target vehicle, the location information of the first target vehicle space, and location information of the road in the image shot by the second camera, where the third navigation route is different from the first navigation route.

In this implementation, if there is an obstacle in the navigation route, in this case, the navigation route is impassible, and the server may re-plan, based on a location of the obstacle, a navigation route that avoids an obstacle section, to ensure availability of the navigation route.

In an implementation, the detecting whether there is an obstacle on a road in an image shot by a second camera includes detecting, by using a disparity depth of field principle, whether there is an object on the road in the image shot by the second camera; when there is an object on the road in the image shot by the second camera, identifying whether the object is a pedestrian or another vehicle; and when the object is not a pedestrian or another vehicle, determining that the object is an obstacle.

In this implementation, there are usually cases in the parking lot, such as a pedestrian walks on the road, and another vehicle occupies the road during parking. However, these cases are only temporary cases, but do not hinder passage of the target vehicle. Therefore, a detected pedestrian and a detected vehicle are not set to be obstacles. In a driving process of the vehicle, if a sensor on the vehicle or the driver finds the pedestrian or the another vehicle, whistle prompting or stopping and waiting may be selected. When the pedestrian or the vehicle leaves the road, the target vehicle may continue to follow the navigation route.

In an implementation, the method further includes receiving a third instruction sent by the terminal device, where the third instruction indicates that the user searches for the target vehicle parked in the first target parking space; determining location information of the user; generating a fourth navigation route based on the location information of the user and the location information of the first target parking space, where the third navigation route is a navigation route for the user to reach the first target parking space; and sending the fourth navigation route to the terminal device.

In this implementation, after the driver leaves the parking lot, a vehicle finding process is as follows. The driver may scan an obvious sign or object, for example, a parking space sign in the parking lot, by using a mobile phone, to implement self-positioning, so that a path between the driver and a parking location of the target vehicle is generated on the map, to effectively help the driver quickly find the target vehicle anytime and anywhere.

In an implementation, the determining location information of the user includes receiving a second image sent by the terminal device, where the second image is an image obtained by the user by photographing a scenario in the parking lot by using the terminal device; and comparing the scenario included in the second image with the stored parking lot map, to determine a location of the user.

According to a second aspect, an embodiment of this application provides a navigation apparatus, including a transceiver, configured to obtain images shot by a plurality of cameras, where the plurality of cameras are disposed in a parking lot; and a processor, configured to obtain location information of a target vehicle based on the images shot by the plurality of cameras; obtain location information of a first target parking space, where the first target parking space is a vacant parking space for parking the target vehicle; and generate a first navigation route based on the location information of the target vehicle and the location information of the first target parking space, where the first navigation route is a navigation route for the target vehicle to reach the first target parking space. The transceiver is further configured to send the first navigation route to a terminal device, where the terminal device is a navigation device of a user of the target vehicle.

In an implementation, the processor is further configured to set a state of the first target parking space from a vacant state to a non-vacant state.

In an implementation, the transceiver is configured to receive vehicle information of the target vehicle sent by the terminal device; and the processor is further configured to identify, based on the vehicle information of the target vehicle, a first image from the images shot by the plurality of cameras, where the first image includes the target vehicle; and determine the location information of the target vehicle by using the first image and a stored parking lot map.

In an implementation, the first target parking space is a vacant parking space closest to the target vehicle.

In an implementation, the transceiver is further configured to send parking space information to the terminal device, where the parking space information is about all vacant parking spaces in the parking lot; and receive a first instruction sent by the terminal device, where the first instruction indicates the first target parking space selected by the user from all the vacant parking spaces in the parking lot.

In an implementation, the transceiver is further configured to receive a second instruction sent by the terminal device, where the second instruction indicates that the user reselects a vacant parking space for parking; the processor is further configured to obtain location information of a second target parking space, where the second target parking space is a vacant parking space for parking the target vehicle other than the first target parking space; and generate a second navigation route based on the location information of the target vehicle and the location information of the second target parking space, where the second navigation route is a navigation route for the target vehicle to reach the second target parking space; and the transceiver is further configured to send the second navigation route to the terminal device.

In an implementation, the processor is further configured to detect whether there is an obstacle on a road in an image shot by a second camera, where the second camera is a camera in the first navigation route; and when it is detected that there is an obstacle on the road in the image shot by the second camera, generate a third navigation route based on the location information of the target vehicle, the location information of the first target vehicle space, and location information of the road in the image shot by the second camera, where the third navigation route is different from the first navigation route.

In an implementation, the processor is configured to detect, by using a disparity depth of field principle, whether there is an object on the road in the image shot by the second camera; when there is an object on the road in the image shot by the second camera, identify whether the object is a pedestrian or another vehicle; and when the object is not a pedestrian or another vehicle, determine that the object is an obstacle.

In an implementation, the transceiver is further configured to receive a third instruction sent by the terminal device, where the third instruction indicates that the user searches for the target vehicle parked in the first target parking space; the processor is further configured to determine location information of the user; and generate a fourth navigation route based on the location information of the user and the location information of the first target parking space, where the third navigation route is a navigation route for the user to reach the first target parking space; and the transceiver is further configured to send the fourth navigation route to the terminal device.

In an implementation, the transceiver is further configured to receive a second image sent by the terminal device, where the second image is an image obtained by the user by photographing a scenario in the parking lot by using the terminal device; and the processor is further configured to compare the scenario included in the second image with the parking lot map stored in the memory, to determine a location of the user.

According to a third aspect, an embodiment of this application provides a navigation system. The system includes a plurality of cameras and a terminal device, to perform the embodiments of the first aspect that may be implemented.

According to a fourth aspect, an embodiment of this application provides a parking lot, including a plurality of cameras, separately disposed at various locations in the parking lot, and configured to photograph all parking spaces and roads in the parking lot; and a server, connected to the plurality of cameras, and configured to perform the embodiments of the first aspect that may be implemented.

According to a fifth aspect, an embodiment of this application provides a computer-readable storage medium, where the computer-readable storage medium stores a computer program, and when the computer program is executed in a computer, the computer is enabled to perform the embodiments of the first aspect that may be implemented.

According to a sixth aspect, an embodiment of this application provides a computing device, including a memory and a processor, where the memory stores executable code, and when executing the executable code, the processor implements the embodiments of the first aspect that may be implemented.

BRIEF DESCRIPTION OF DRAWINGS

The following briefly describes the accompanying drawings used in describing the embodiments or the conventional technology.

DESCRIPTION OF EMBODIMENTS

The following describes the technical solutions in embodiments of this application with reference to the accompanying drawings in the embodiments of this application.

Figure 1:
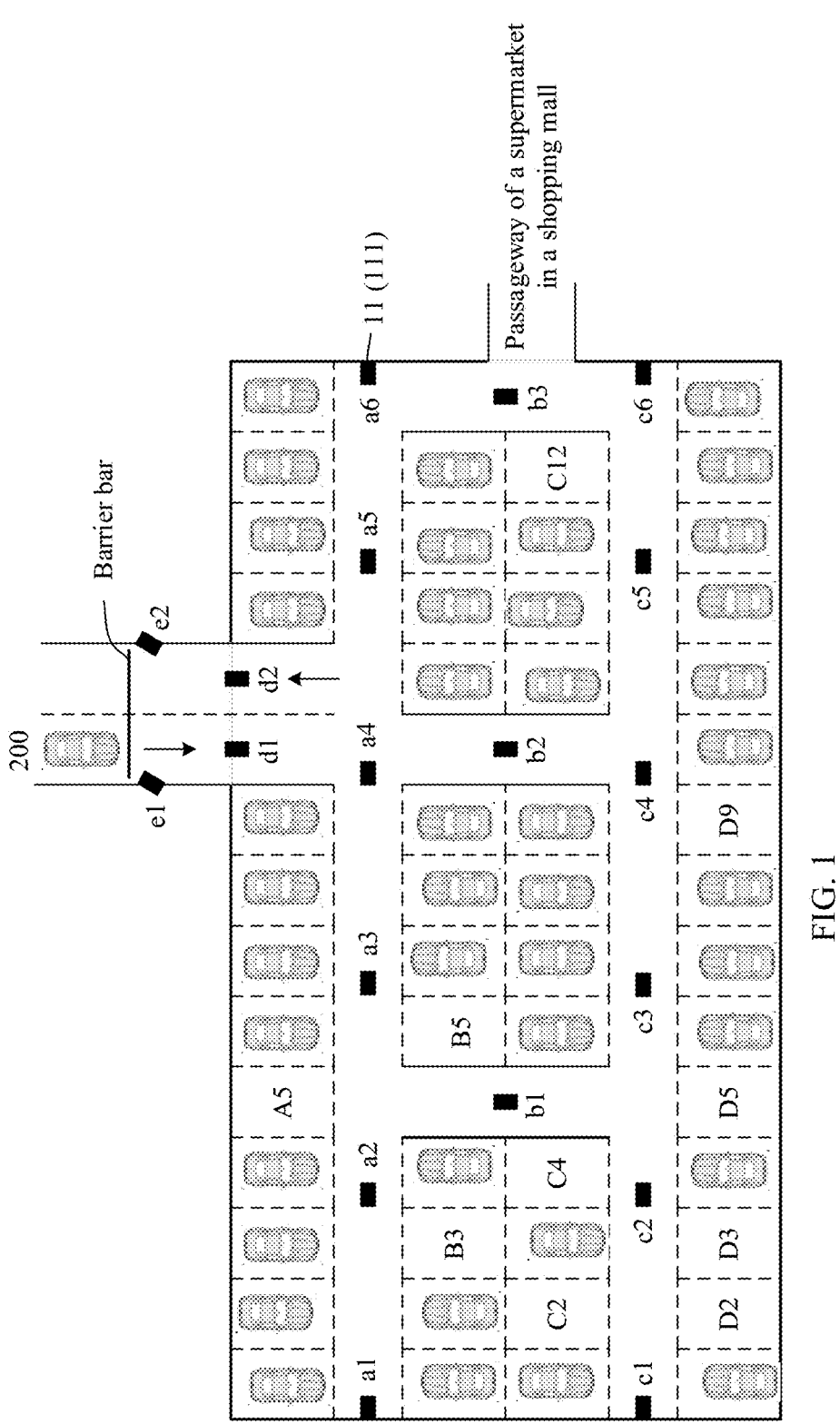
FIG. 1 is a schematic top view of a navigation scenario according to an embodiment of this application.
Figure 2:
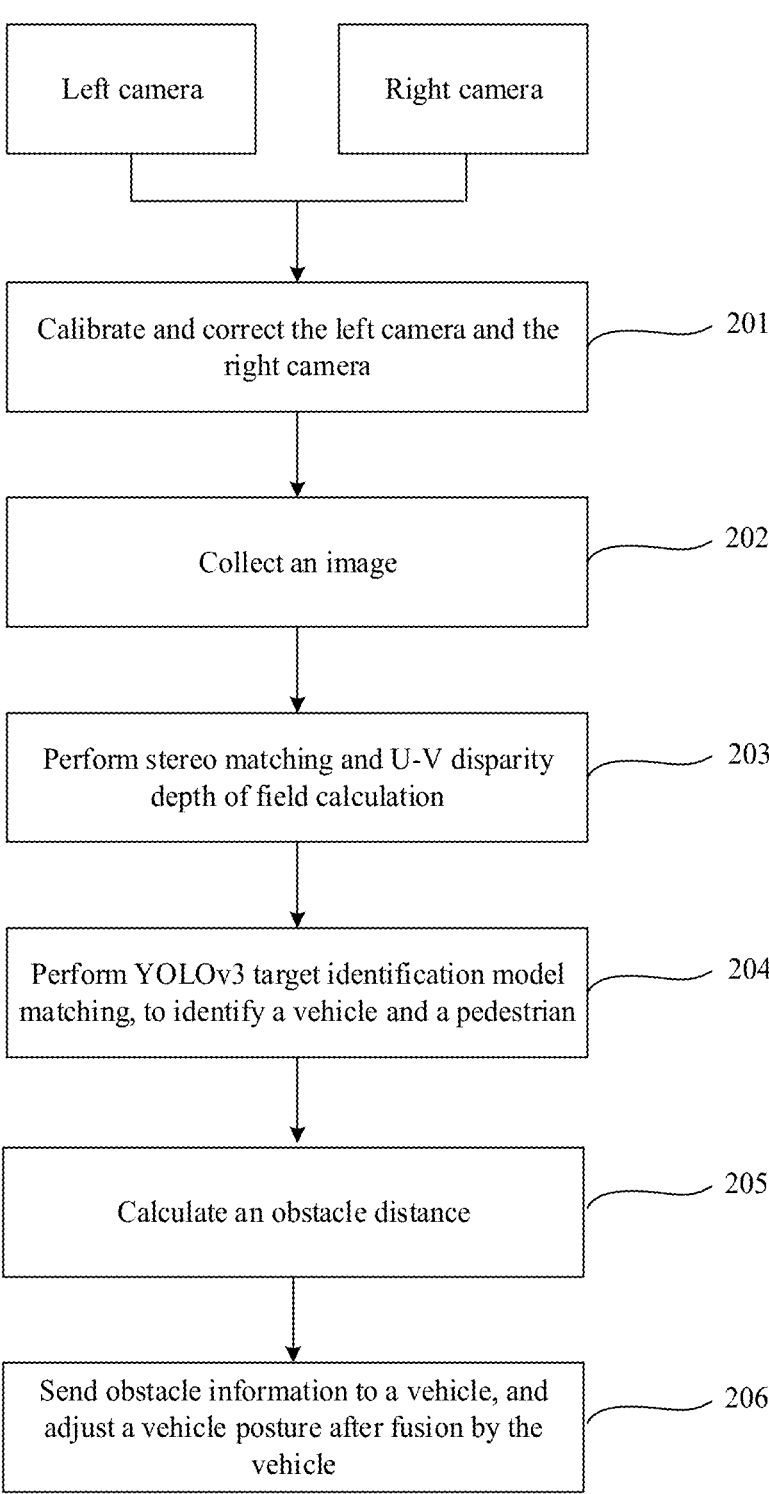
FIG. 2 is a flowchart of stereo vision detection logic of an obstacle by using a navigation system according to an embodiment of this application.

FIG. 1 is a schematic top view of a navigation scenario according to an embodiment of this application. As shown in FIG. 1, in this application, an underground parking lot of a supermarket in a shopping mall is used as an example. A navigation system 10 that implements a navigation function in the parking lot includes a plurality of cameras 11 and one processing device 12 (which is not shown in the figure), and each camera 11 is connected to the processing device 12.

The cameras 11 are divided into road cameras 111 and parking space cameras 112 based on a photographed object. The road cameras 111 are separately disposed at locations in the parking lot, such as roads, a vehicle entrance and a vehicle exit, a passageway of the supermarket in the shopping mall, and an elevator entrance, and are configured to photograph the locations in the parking lot, such as the roads and the passageway. The parking space cameras 112 are separately disposed in or near each parking space, and each parking space camera 112 is configured to photograph one or more parking spaces. For example, as shown in FIG. 1, at least one road camera 111 (a1 to a6, c1 to c6) is disposed on a straight road at an interval of 20 m; at least one road camera 111 (b1 and b2, d1 and d2) is disposed in a turn channel at an interval of 20 m, where an interval less than 20 m is calculated as 20 m; at least one road camera 111 (b3) is disposed at the passageway of the supermarket in the shopping mall; at least one road camera 111 (c1, c2) is also disposed near a barrier bar at the vehicle exit and a barrier bar at the vehicle exit; and at least one parking space camera 112 (which is not shown in the figure) is disposed in each parking space. The cameras 11 may be mounted at locations such as a roof of a basement, a wall surface of the basement, a surface of a post of the basement, and a surface of a lamp post. Usually, the cameras 11 are required to be mounted at locations 2.5 m away from a ground.

The processing device 12 may be a hardware device with a computing capability, for example, a central processing unit (CPU), a computer, or a computer, or may be a server. The processing device 12 establishes a communication connection to each camera 11 by using a physical bus or a communications unit, to receive an image or a video stream shot by each camera 11. In the following embodiments, the server is used to describe the technical solutions of this application.

The server 12 further has a storage capability. If the server 12 is a hardware device, the server 12 includes a memory, configured to store data such as the image or the video stream uploaded by the camera 11, an algorithm used to process the image or the video stream, and a high-definition map of the parking lot. The high-definition map of the parking lot includes information such as locations of parking spaces on the ground, sizes of the parking spaces, a layout of roads, and lengths and widths of the roads, and information such as cameras, locations of the cameras, signs on wall surfaces, locations of the signs, street lamps, and locations of the street lamps.

In addition, the parking lot in this scenario further includes a plurality of ground locks 131 (which are not shown in the figure) or a plurality of displays 132 (which are not shown in the figure). If the parking lot includes the ground locks 131, when a parking space is in a vacant state or is reserved by a driver, the ground lock 131 is in a locked state (or the ground lock 131 is raised from the ground); and when there is a vehicle parked in the parking space, the ground lock 131 is in an unlocked state (or the ground lock 131 is locked underground). If the parking lot includes the displays 132, one display 132 is disposed above each parking space. When there is a vehicle parked in the parking space, the display 132 displays text or a sign indicating that the parking space is occupied by the vehicle; when the parking space is reserved by another user for parking, the display 132 displays text or a sign indicating that the parking space is reserved; and when the parking space is neither occupied by the vehicle nor reserved, the display 132 displays text or a sign indicating that the parking space is in a vacant state.

In an example, the parking lot in this application further includes devices necessary to the parking lot, such as the street lamps, the barrier bars, and road fences. Details are not described in this application.

The parking lot used in the embodiments of this application is not limited to the foregoing built-up parking lot, but a parking lot on the ground, a roadside parking lot, or the like may be further applied. In this application, the foregoing built-up parking lot is merely used as an example, to describe a solution for implementing a navigation function by using the navigation system 10 provided in the embodiments of this application.

Embodiment 1

In this application, in an implementation process of navigation, the navigation system 10 needs to detect an obstacle by using a binocular ranging principle. To meet the binocular ranging principle, two monocular cameras or one binocular camera are/is mounted at each location of a1 to a6, b1 to b3, c1 to c6, and c1 and c2 in the parking lot shown in FIG. 1. If there are two monocular cameras, the two monocular cameras are respectively located on two sides of a middle line of a road. Therefore, the road camera 111 that photographs a road at each location is a "binocular camera". A process of detecting an obstacle by the server 12 is as follows (a location of a point a4 is used as an example).

201: The server 12 calibrates and corrects a left camera and a right camera.

In an example, the server 12 obtains internal parameter matrices (including a camera focal length, an optical center coordinate, a lens distortion coefficient, and the like) and external parameter matrices (including a rotation matrix R and a shift matrix t) of each of the two cameras at the location of the point a4, and may learn, based on camera calibration, a conversion matrix from a world coordinate system to a pixel coordinate system and complete distortion correction of an image.

Figure 3:
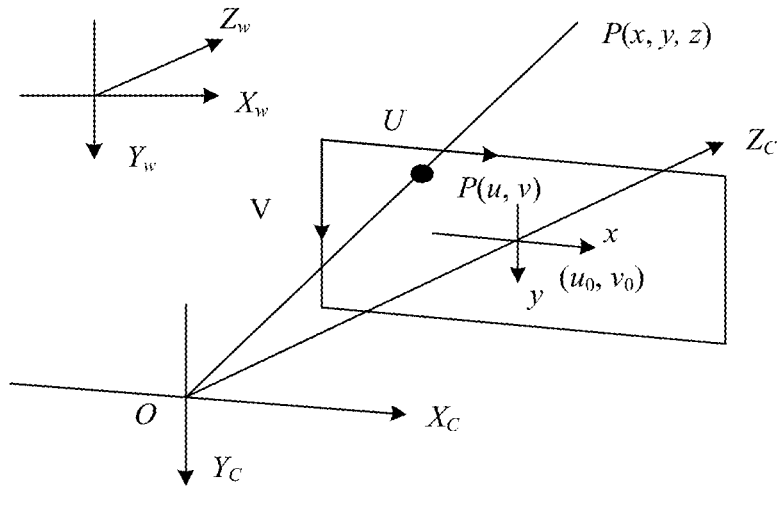
FIG. 3 is a schematic diagram of a conversion relationship between a pixel coordinate and a world coordinate according to an embodiment of this application.

For example, as shown in FIG. 3, the world coordinate system is a coordinate of an object in a real world. For example, an origin of a world coordinate system of a black and white checkerboard grid is a vertex of a first checkerboard grid, Xw, Yw, and Zw are perpendicular to each other, and a Zw direction is a direction perpendicular to a checkerboard grid panel. In a camera coordinate system, an optical center is used as an origin of the camera coordinate system, an x direction and a y direction parallel to an image are an Xc axis and a Yc axis, a Zc axis is parallel to an optical axis, Xc, Yc, and Zc are perpendicular to each other, and a unit is a length unit. In an image physical coordinate system, an intersection point of a primary optical axis and an image plane is used as a coordinate origin, an x direction and a y direction are shown in the figure, and a unit is a length unit. In an image pixel coordinate system, a vertex of an image is used as a coordinate origin, and a u direction and a v direction are parallel to an x direction and a y direction, and a unit is expressed in a pixel.

The conversion relationship between the world coordinate system and the pixel coordinate system is as follows:

$$Z_C \begin{bmatrix} u \\ v \\ 1 \end{bmatrix} = \begin{bmatrix} \dfrac{1}{d_x} & 0 & u_0 \\ 0 & \dfrac{1}{d_y} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & t \\ 0^T & 1 \end{bmatrix} \begin{bmatrix} X_w \\ Y_w \\ Z_w \\ 1 \end{bmatrix} \tag{1}$$

dx and dy are physical sizes of each pixel in an x-axis direction and a y-axis direction, f represents a focal length of a camera, R represents a rotation matrix, and t is a translation vector.

An internal parameter matrix Mat1 of the camera is:

$$Mat1 = \begin{bmatrix} \frac{1}{d_x} & 0 & u_0 \\ 0 & \frac{1}{d_y} & u_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} = \begin{bmatrix} f & 0 & u_0 \\ 0 & f & v_0 \\ 0 & 0 & 1 \end{bmatrix} \quad (2)$$

In a stereo correction process, because of lens imaging, the server 12 forms a distortion phenomenon on an edge of an image. In addition, unreasonable locations of the two cameras also cause a change in imaging. These factors affect subsequent stereo matching. Therefore, a correction operation needs to be performed on these factors, to eliminate lens distortion and simultaneously turn a stereo vision system into an ideal standard model.

202: The server 12 obtains images shot by the left camera and the right camera.

In this application, an area between a4 and a5 needs to be monitored at the location of the point a4. Therefore, when the road camera 111 is disposed at the location of the point a4, both a shooting direction and a shooting angle of the road camera 111 face the area between a4 and a5, so that the road camera 111 disposed at the location of the point a4 can photograph the area between a4 and a5. When the road camera 111 at the location of the point a4 needs to operate, the two cameras at the location of the point a4 are controlled to continuously photograph the road, so that all image information of the road within a field of view is obtained by using the binocular camera.

203: The server 12 performs stereo matching and U-V disparity depth of field calculation.

In an example, after completing procedures such as calibration and correction, the server 12 shoots a plurality of stereo vision pictures based on the area between a4 and a5, and restores three-dimensional information of a scenario by matching a same point, to calculate depth information of an object.

Figure 4:
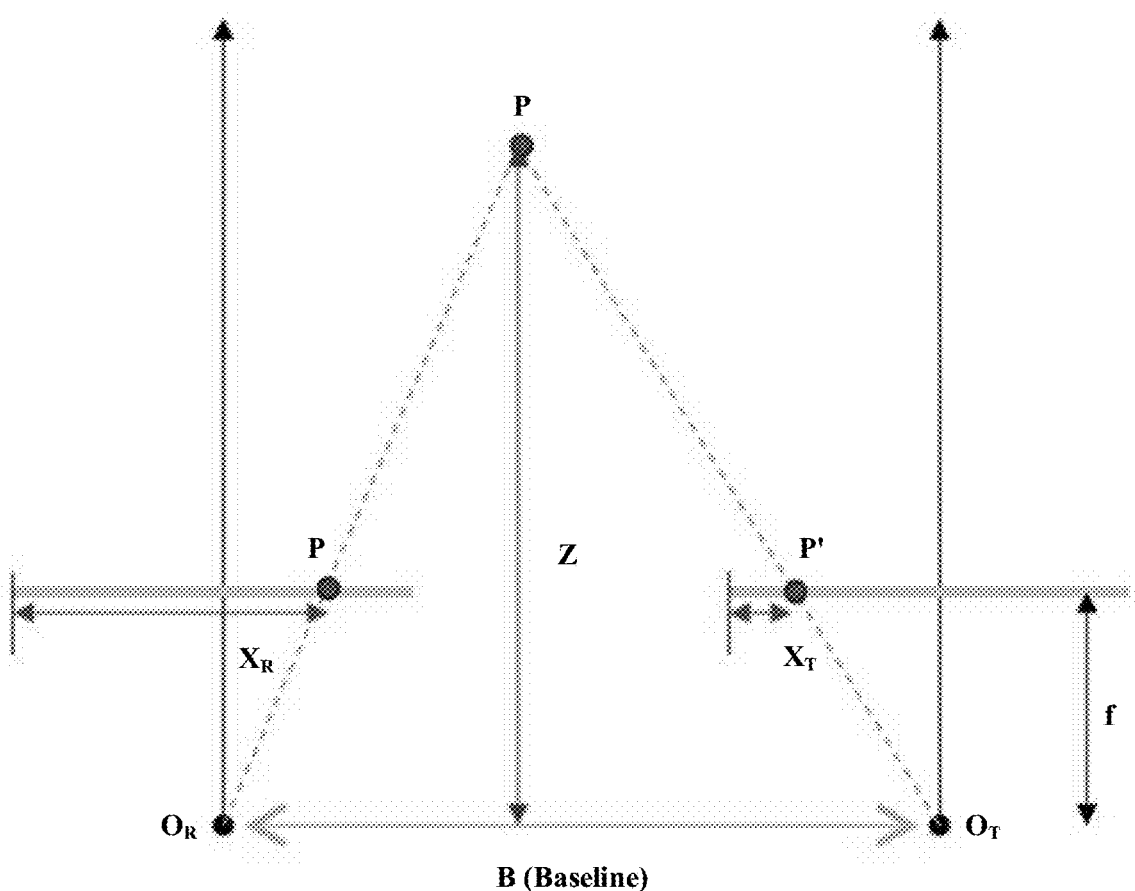
FIG. 4 is a schematic diagram of a depth information calculation principle in a stereo vision system according to an embodiment of this application.

For example, as shown in FIG. 4, it is assumed that P is a point in a space, OR is an optical center of the left camera, OT is an optical center of the right camera, focal lengths of the cameras are f (distances between the optical centers and imaging planes), the imaging planes are on a plane in which a point PP' in the figure is located, B represents a distance between the optical centers of the two cameras, which is also referred to as a baseline, imaging points of P on an imaging plane of the left camera and an imaging plane of the right camera are respectively p and p', and $x_R$ and $x_T$ are distances of the imaging points in a horizontal direction. Therefore, a depth Z is:

$$\frac{B}{Z} = \frac{B - (x_R - x_T)}{Z - f} \Rightarrow Z = \frac{B \cdot f}{x_R - x_T} = \frac{B \cdot f}{D} \quad (3)$$

$D = x_R - x_T$, which is usually referred to as disparity (disparity).

It can be learned from the foregoing formula (3) that, the depth Z is inversely proportional to the disparity D. Smaller disparity Z indicates larger D, that is, an object is farther away from the stereo vision system. Larger disparity Z indicates smaller D, that is, the object is closer to the stereo vision system. This is the same as a human-eye system. When a person observes an object that is close to the person, a disparity is extremely large, and more information may be obtained. When the object is far away from the person, the disparity is extremely small, and less information is obtained. In image processing, a gray value is usually used to represent disparity information. A larger disparity indicates a larger gray value, and a visual effect of a disparity image is that the image is lighter. When the object is in a far distance, a smaller disparity indicates a smaller gray value, and the visual effect of the disparity image is that the image is darker.

204: The server 12 identifies a vehicle and a pedestrian by using a YOLOv3 target identification model.

YOLO is an object identification and positioning algorithm based on a deep neural network. A largest feature of YOLO is a fast running speed, so that YOLO can be used in a real-time system. In YOLO, an object detection task is directly used as a regression problem (regression problem) for processing; two stages are combined into one selective search and detection; and it only takes a glance to learn what objects are in each image and locations of the objects.

In an example, selective search is not removed from YOLO. Instead, an input picture is directly divided into $7 \times 7 = 49$ grids. Two border frames are predicted by using each grid, and there are totally $49 \times 2 = 98$ border frames are predicted. It may be approximately understood that, 98 candidate areas are roughly selected on the input picture, and the 98 candidate areas cover an entire area of the picture, so that border frames corresponding to the 98 candidate frames are predicted through regression.

Figure 5:
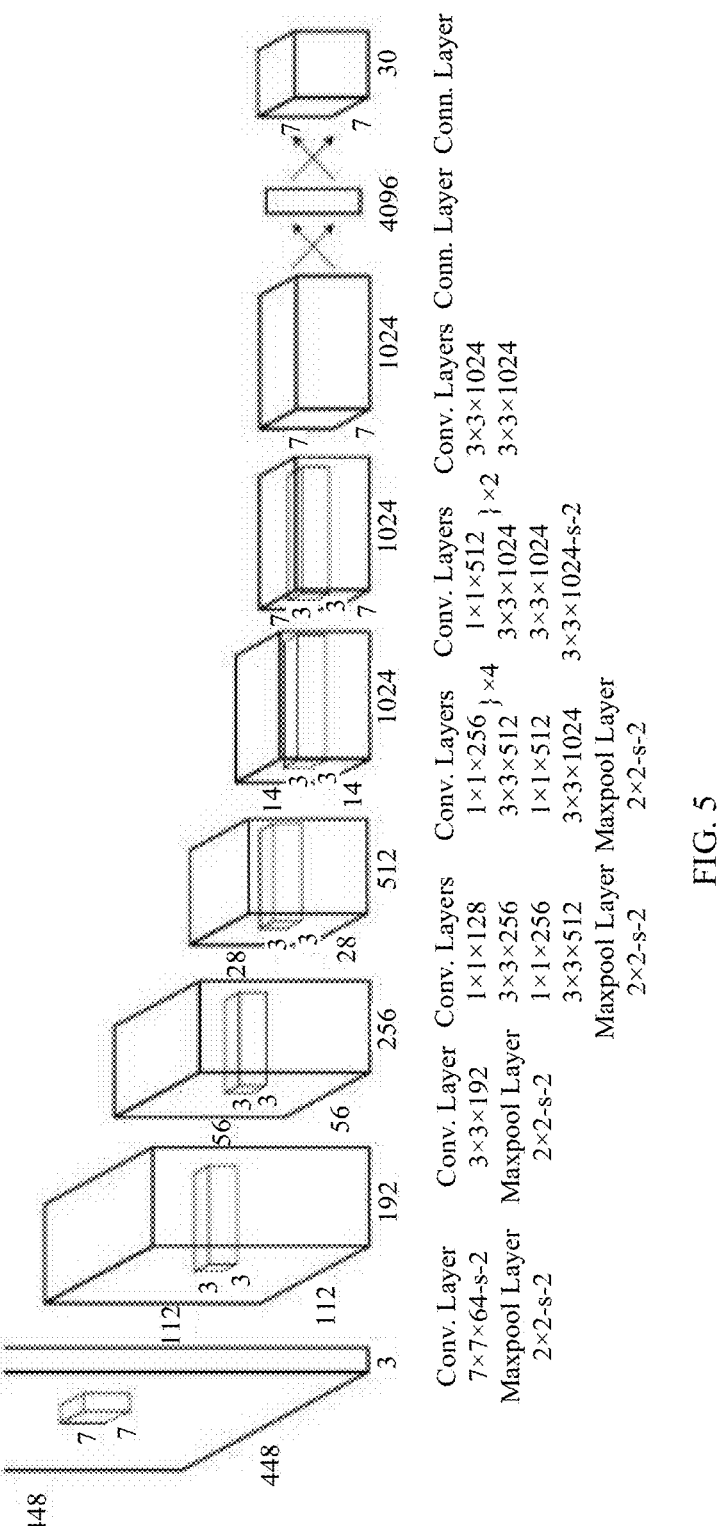
FIG. 5 is a schematic diagram of you only look once (YOLO) training according to an embodiment of this application.

The YOLO network uses a GoogleNet classification network structure for reference, a difference is that in YOLO, a $1 \times 1$ convolutional layer and a $3 \times 3$ convolutional layer are used to replace an inception module. A network structure is shown in FIG. 5. A whole detection network includes 24 convolutional layers and two fully-connected layers. The convolutional layer is used to extract an image feature, and the fully-connected layer is used to predict an image location and a category probability value.

In YOLO, identification and positioning are combined into one, so that a structure is simple and a detection speed is fast, and faster YOLO can reach 155 FPS. Relative to a recurrent neural network (RNN) series, information about an entire image can be seen in an entire procedure of YOLO. Therefore, in YOLO, context information can be better used during object detection, so that incorrect object information is not easy to be predicted on a background. In addition, YOLO may learn a highly generalized feature, and can migrate a feature learned in a domain to a different but related domain. For example, YOLO that performs training on a natural image may obtain a good test result in an art picture.

YOLOv3 is a third version of a YOLO series target detection algorithm. Compared with previous algorithms, especially for a small target, precision of YOLO version 3 (YOLOv3) is significantly improved. In this application, pedestrian pictures and vehicle pictures are trained by using YOLO, to obtain a YOLOv3 training model, and then a pedestrian and a vehicle in an image shot by a camera are determined based on the YOLOv3 training model.

The YOLOv3 training model performs multi-task training by cascading a deep neural network. A D-Net is responsible for detecting a location of a human body and a location of the vehicle, and training and outputting monocular depth information estimation of the image at the same time; and an M-Net processes and filters an output, and trains and outputs Landmark key point positioning. The D-Net and the M-Net are combined to further eliminate non-interference, output an accurate human body and an accurate vehicle, and output relative depth information of the human body and the vehicle by using a depth extraction module.

205: The server 12 calculates an obstacle distance.

Figure 6:
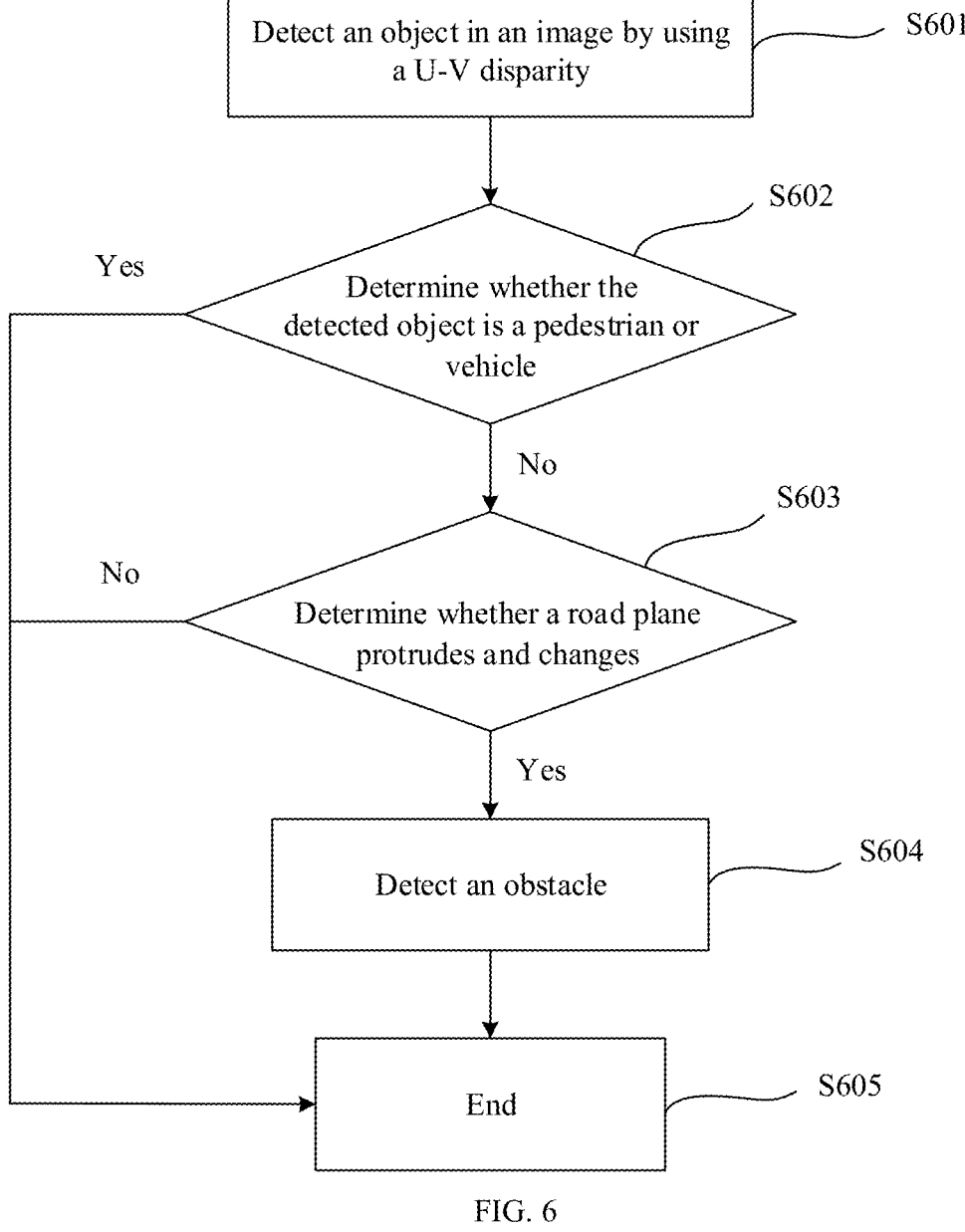
FIG. 6 is a flowchart of calculating a distance to an obstacle according to an embodiment of this application.

For example, as shown in FIG. 6, an implementation process of calculating the obstacle distance by the server 12 is as follows.

Step S601: Detect an object in the image by using a U-V disparity. An implementation process is described in FIG. 5 and the content corresponding to FIG. 5. Details are not described herein again in this application.

Step S602: Determine whether the detected object is a pedestrian or vehicle; and if the detected object is a pedestrian or vehicle, perform step S603, or if the detected object is not a pedestrian or vehicle, perform step S605.

In an example, after detecting that there is an obstacle by using the U-V disparity, the server 12 determines whether the obstacle is a pedestrian and a vehicle; and if the obstacle is a pedestrian and a vehicle, the server 12 discards the detected obstacle, or if the obstacle is not a pedestrian and a vehicle, the server 12 determines a size and a distance of the obstacle based on a correspondence between a monocular pixel and a binocular depth.

Step S603: Determine whether a road plane protrudes and changes; and if the road plane protrudes and changes, perform step S604, or if the road plane does not protrude and change, perform step S605.

In an example, in FIG. 4 and the content described in FIG. 4, in image processing, a gray value is usually used to represent disparity information. A larger disparity indicates a larger gray value, and a visual effect of a disparity image is that the image is lighter. When the object is in a far distance, a smaller disparity indicates a smaller gray value, and the visual effect of the disparity image is that the image is darker.

Figure 7A:
FIG. 7A is an original image of a scenario photographed by a camera according to an embodiment of this application.
Figure 7B:
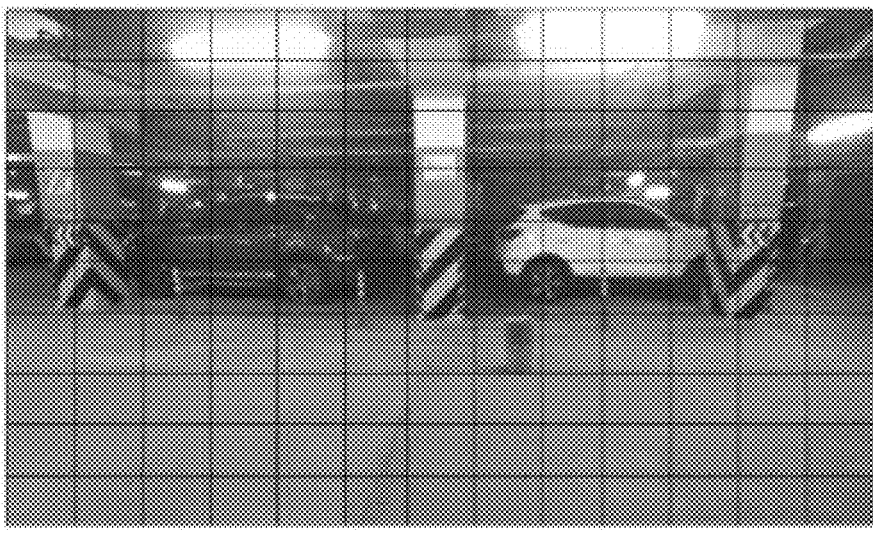
FIG. 7B is an original image of performing rasterization on a scenario photographed by a camera according to an embodiment of this application.
Figure 7C:
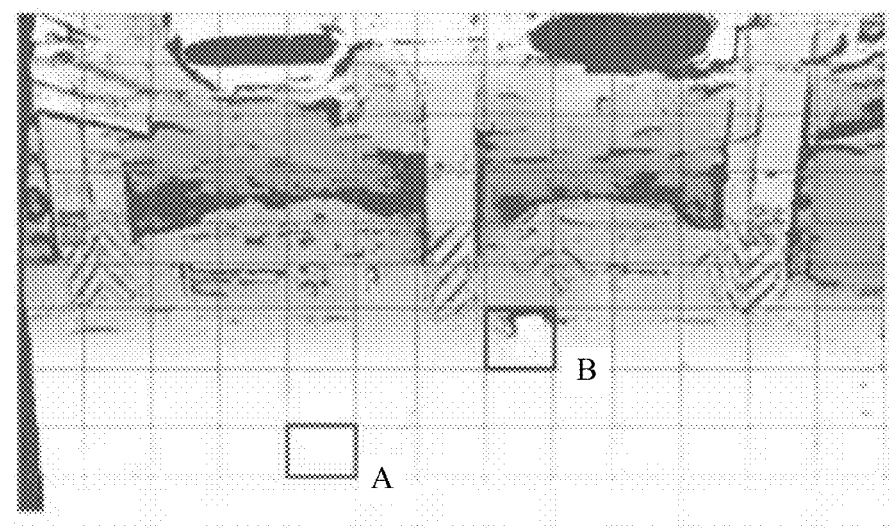
FIG. 7C is a depth image of performing rasterization on a scenario photographed by a camera according to an embodiment of this application.

For example, as shown in FIG. 7A, the server 12 is configured to control the binocular camera mounted on a center line of the road to continuously shoot at a fixed angle, to obtain a continuously fixed image; then perform rasterization on the obtained image, and distinguish a road surface area and another area, as shown in FIG. 7B, where an area that does not include a road surface is used as an invalid area, and is not used in operation, and an area that includes the road surface is used as a valid area, and is used in next operation; and convert a rasterized color image into a rasterized depth image, as shown in FIG. 7C.

Figure 8A:
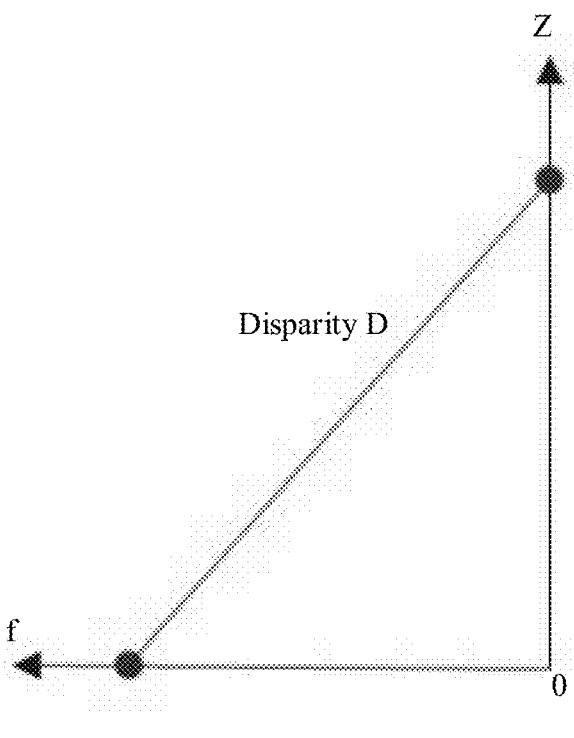
FIG. 8A shows a relationship between a depth and a disparity of a grid with no obstacle according to an embodiment of this application.
Figure 8B:
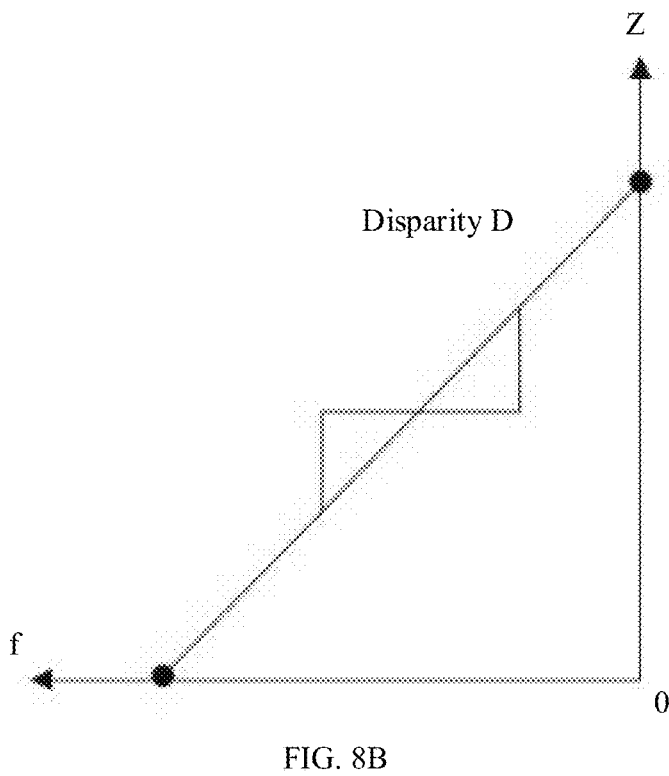
FIG. 8B shows a relationship between a depth and a disparity of a grid with an obstacle according to an embodiment of this application.

For a grid A in FIG. 7C, because there is no obstacle, a sudden change in disparity data does not occur, and a relationship between a disparity D, a depth Z, and a focal length f of the grid A is shown in FIG. 8A. For a grid B in FIG. 7C, because there is an obstacle, a sudden change in disparity data occurs, and a relationship between a disparity D, a depth Z, and a focal length f of the grid B is shown in FIG. 8B.

An error of the disparity D is related to a baseline length of a rasterized grid, as shown in formula (4):

$$\Delta z = -s \cdot \frac{Z}{f} \cdot \frac{Z}{b} \Delta p \qquad (3)$$

Δz represents an error of a disparity D, s represents a pixel size of a pixel, Z is a depth, f represents a camera focal length, b represents a baseline length, and Δp represents an image matching error.

Figure 9:
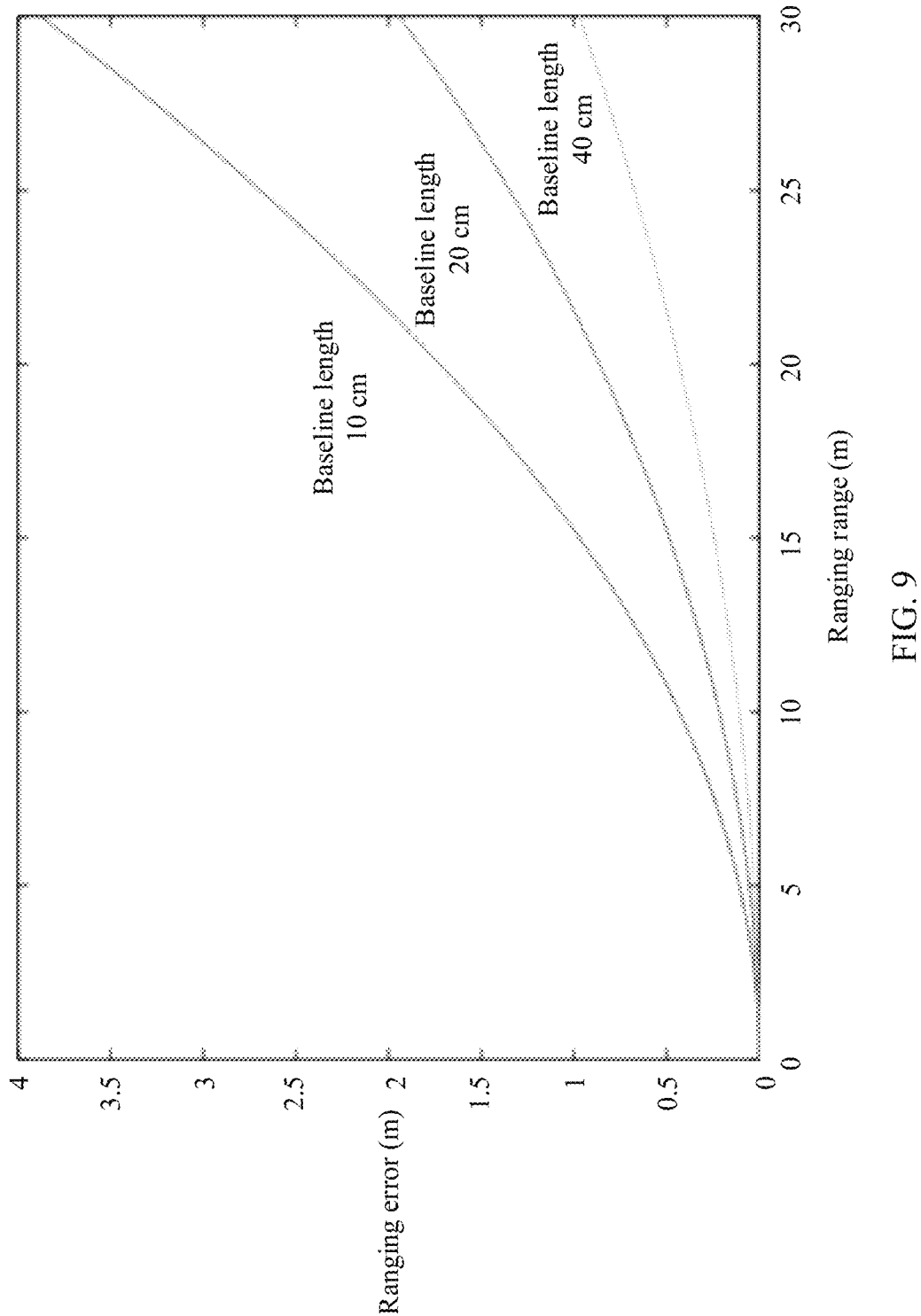
FIG. 9 is a curve chart of an error change of a disparity in different baseline lengths according to an embodiment of this application.

Measurement implemented by using an M2391 monocular camera is used as an example for description. When M2391 operates in a 1080 P mode, a pixel size is 6.9 μm, a camera focal length is 16 mm, and a positioning error is quantitatively calculated when a disparity matching error is one pixel. When the baseline length is 10 cm, 20 cm, and 40 cm, an error change curve of the disparity D is shown in FIG. 9.

Figure 10:
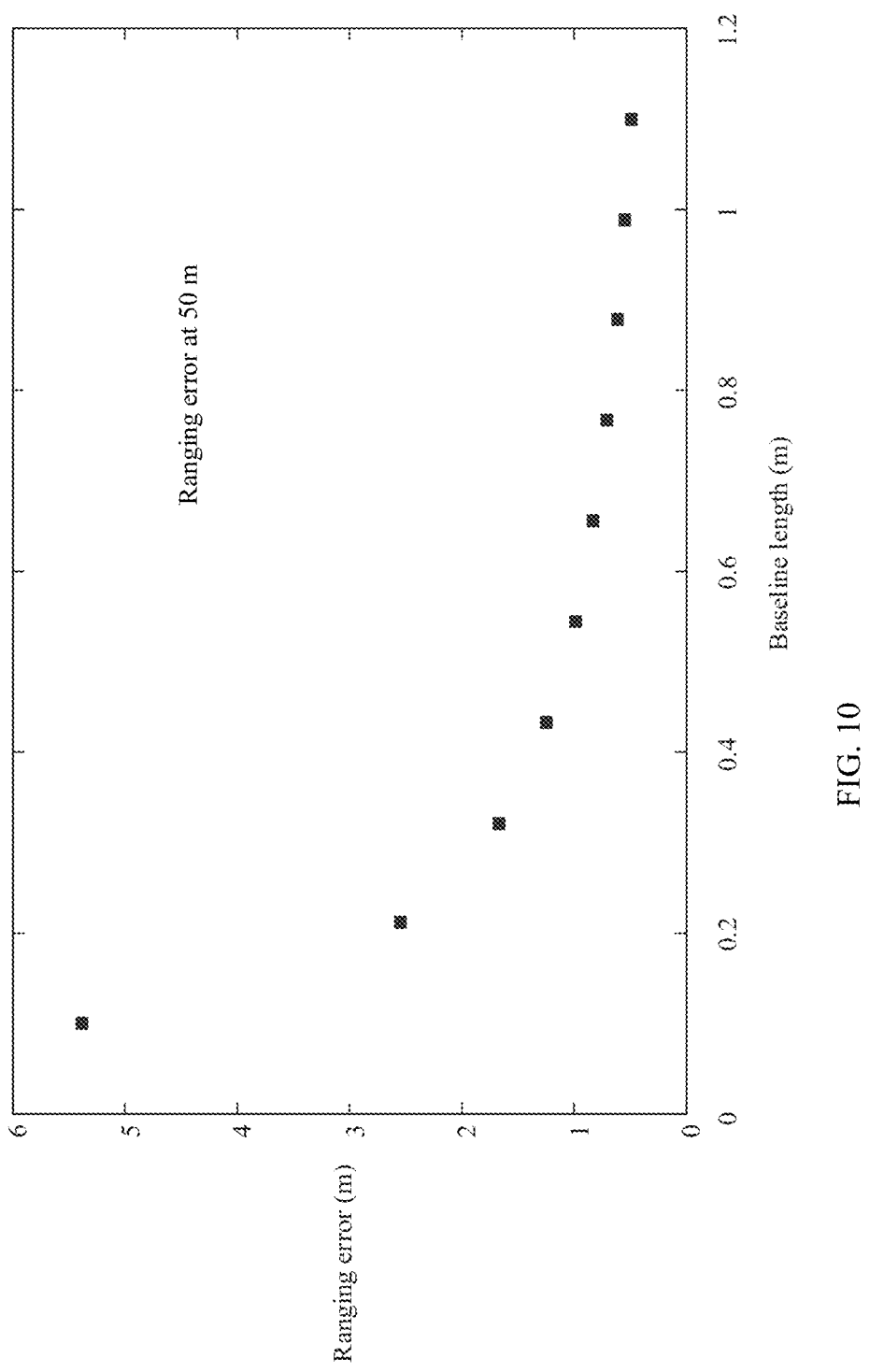
FIG. 10 is a schematic diagram of a measured error result obtained by simulation of an image shot by a binocular camera according to an embodiment of this application.

A binocular camera is used to perform measurement. An actual parameter simulation result is shown in FIG. 10. A smaller baseline length indicates a larger ranging error, and a larger baseline length indicates a smaller ranging error. It can be learned from measurement comparison that, an error of stereo vision measurement is greatly reduced compared with an error of the monocular camera, and is reduced from a meter level to a centimeter level, provided that the baseline length is large enough.

Step S604: Detect an obstacle.

In this application, if it is detected, by using the disparity, that a non-planar object occurs on the road, the YOLO object identification model is used to perform comparison. If the object is a pedestrian or vehicle, the server 12 does not perform prompting to indicate that there is an obstacle; or if the object is not a pedestrian or vehicle, but a disparity change is detected, the server 12 determines that the object is an obstacle, and notifies a vehicle to stop or detour to avoid the obstacle.

Step S605: End the process.

206: Send the obstacle to a vehicle that uses information or a navigation APP.

In an example, compared with that in an existing indoor positioning solution, positioning precision of a positioning capability of the camera disposed in this application is improved to a range from 10 cm to 20 cm. In addition, more information is included, including statistic road information and including dynamic road information that continuously changes. In addition, an update frequency and a distribution manner of a positioning function in this application are significantly changed, that is, the update frequency is changed from existing monthly updating to second-level/millisecond-level real-time updating, thereby providing a user with a dynamic navigation function, greatly improving user experience, and facilitating safe driving.

Figure 11:
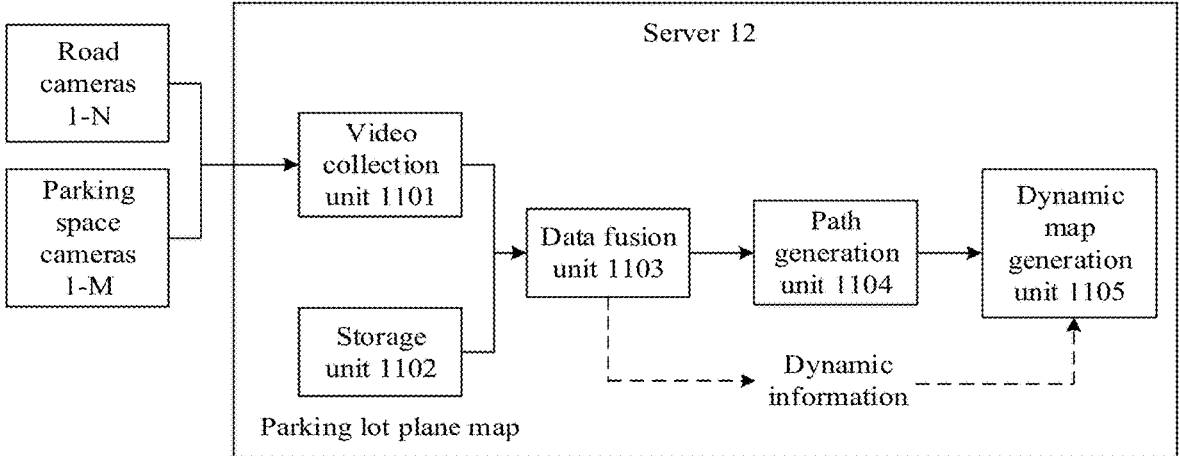
FIG. 11 is a schematic diagram of a structure of a processing device according to an embodiment of this application.

In an actual application, after obtaining the static road information and the dynamic road information, the server 12 superimposes the two kinds of information on the map, and an obtained superimposed map that changes in real time is a scenario that changes in real time in the parking lot. Then, the server 12 generates a navigation route based on a location of a target vehicle and a location of a target parking space, and updates the navigation route in real time with reference to the scenario that changes in real time in the parking lot. For example, as shown in FIG. 11, the server 12 may include, based on an execution function, a video collection unit 1101, a storage unit 1102, a data fusion unit 1103, a path generation unit 1104, and a dynamic map generation unit 1105.

The video collection unit 1101 is configured to receive images or video streams shot by road cameras 1111-N and parking space cameras 1121-M.

The storage unit 1102 is configured to store a parking lot plane map.

The data fusion unit 1103 is configured to generate, based on the collected images or video streams and the parking lot plane map, information including the following content such as which parking spaces are vacant and corresponding location information, location information of a target vehicle, whether there is an obstacle on a road, a type of the obstacle, a location and a motion track of the obstacle, dynamic information (including location data, a speed, and a direction of the vehicle; location data, a speed, and a direction of a pedestrian; and location data, a speed, and a direction of the obstacle), and the like.

The path generation unit 1104 is configured to generate, based on the information (not including the dynamic information) generated by the data fusion unit 1103, a navigation route for the target vehicle to reach the target parking space.

The dynamic map generation unit 1105 is configured to generate, based on the navigation route and the dynamic information, a dynamic navigation route map that may be displayed on a screen, and then push the dynamic navigation route map to an APP on a terminal of a driver or an in-vehicle central control screen.

Figure 12:
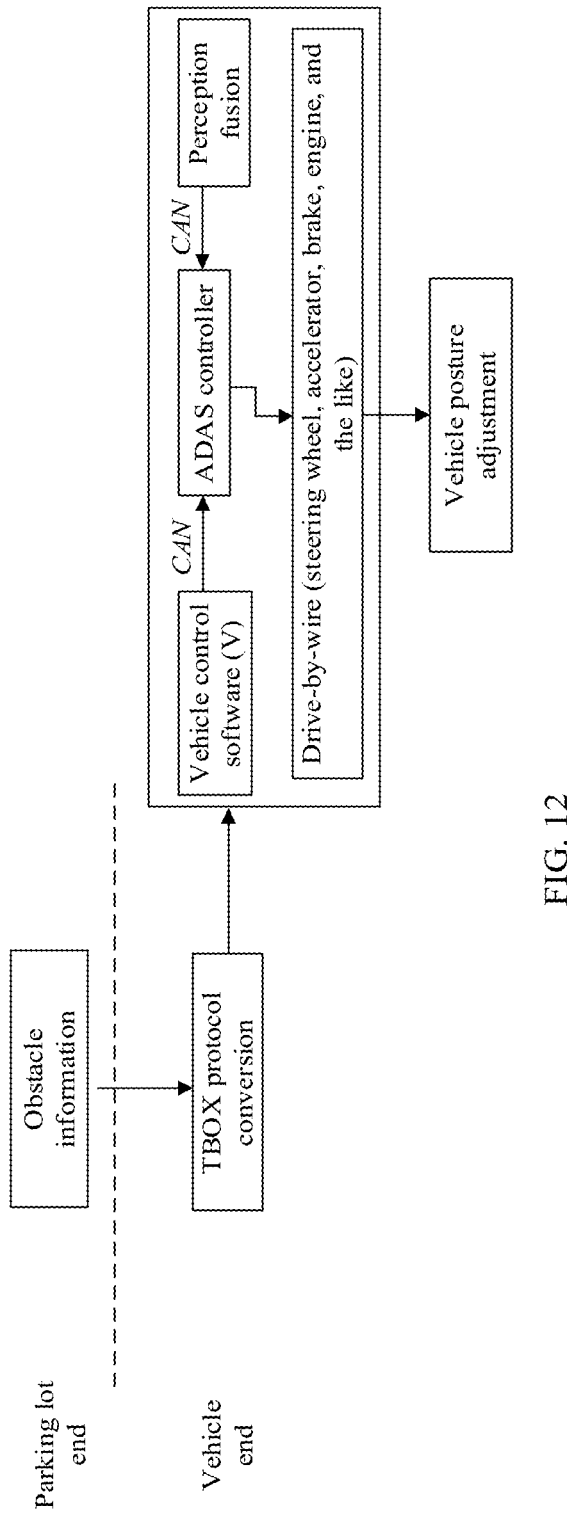
FIG. 12 is a schematic diagram of an implementation process of automated valet parking of a vehicle when an obstacle is received according to an embodiment of this application.

If the target vehicle is an autonomous vehicle, the server 12 sends the dynamic navigation route map to the target vehicle, and needs to send the type and location information of the obstacle to the target vehicle, so that the target vehicle implements an automated valet parking (AVP) function. As shown in FIG. 12, a process in which the target vehicle implements AVP is as follows.

Step S1201: After the location of the obstacle is identified in a vision manner on the parking lot side, send information about the obstacle (including information such as the location, a coordinate, and a size of the obstacle) to the vehicle end.

Step S1202: After receiving the information about the obstacle and performing protocol analysis, an in-vehicle communications unit sends instructions to an electronic control unit (ECU).

Step S1203: The ECU performs calculation and decision-making on the information that is about the obstacle and that is sent from the parking lot side.

Step S1204: If the vehicle decides not to use the information about the vehicle, the vehicle discards the information and continues driving.

Step S1205: If the vehicle decides to use the information about the vehicle, the ECU processes the information about the vehicle, and converts the information about the vehicle into a drive-by-wire command by using a Controller Area Network (CAN) bus.

Step S1206: Adjust a vehicle posture through drive-by-wire (accelerating/braking/steering).

Embodiment 2

Figure 13:
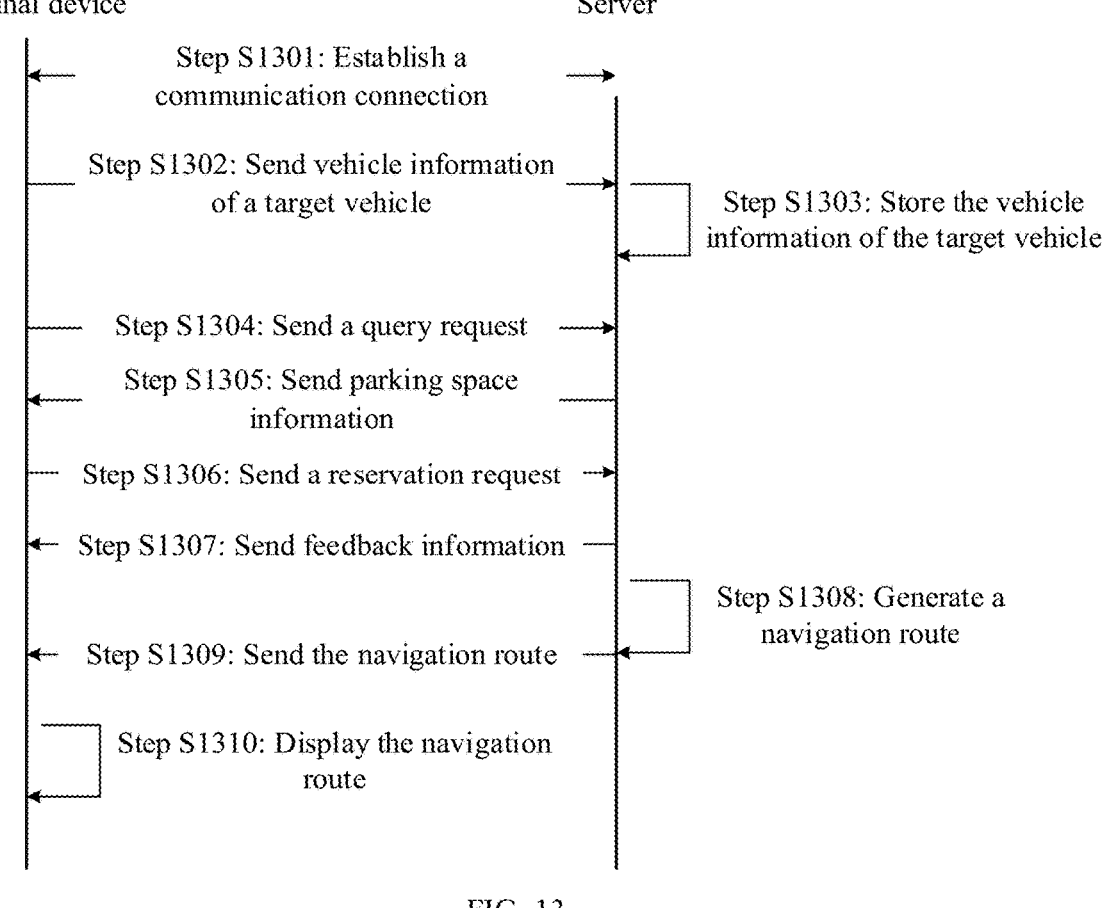
FIG. 13 is a flowchart of an implementation process of a navigation method according to an embodiment of this application.

FIG. 13 is a flowchart of an implementation process of a navigation method according to an embodiment of this application. As shown in FIG. 13, in this application, a terminal device used by a driver is used as an example to describe implementation of a navigation function with the server 12. An implementation process is as follows.

Step S1301: The terminal device establishes a communication connection to the server 12.

Before establishing the communication connection to the server 12, the terminal device pre-stores vehicle information of a vehicle, such as a license plate number of the vehicle, a color of the vehicle, and a brand of the vehicle. For example, in the terminal device, an application (APP) that has a navigation function, for example, a mobile applications such as Amap or a Didi Dache, is installed. When the driver uses the application for the first time, and opens the APP, the APP automatically prompts the driver to fill the vehicle information such as the license plate number of the vehicle, the color of the vehicle, and the brand of the vehicle, and then the APP stores the vehicle information, to send the vehicle information to the server 12 of the parking lot when subsequently communicating with the server 12 of the parking lot.

The communication connection established between the terminal device and the server 12 is actually for data transmission. Therefore, the communication connection established in this application may be implemented by using a wireless communication connection, for example, second generation (2G)/third generation (3G)/fourth generation (4G)/fifth generation (5G), a wireless local area network (WLAN), wireless fidelity (Wi-Fi), Long-Term Evolution (LTE), or LTE-vehicle (LTE-V). This is not limited in this application.

An initiator that establishes a multi-screen connection is usually a terminal device. For example, when the driver drives the vehicle to an entrance of the parking lot, and the driver needs to determine whether there is still a vacant parking space in the parking lot, the driver opens the APP, and may search for a connection port of the server 12 of the parking lot in a manner, for example, two-dimensional code scanning or page searching. The driver may establish a communication connection between the terminal device and the server 12 of the parking lot in a manual tapping manner.

Step S1302: The terminal device sends vehicle information of a target vehicle to the server 12. The target vehicle is the vehicle that the driver is driving.

Step S1303: The server 12 stores the vehicle information of the target vehicle.

In an example, if the communication connection is established between the terminal device and the server 12 for the first time, the terminal device needs to send the vehicle information of the target vehicle to the server 12, and the server 12 stores the received vehicle information, so that the server 12 subsequently identifies a location of the target vehicle based on the vehicle information. If the terminal device is not connected to the server 12 for the first time, the server 12 has pre-stored the vehicle information of the target vehicle. After establishing the communication connection to the terminal, the server 12 searches, based on identity information of the terminal device, for the vehicle information that is bound to the terminal device and that is stored in the server 12.

Step S1304: The terminal device sends a query request to the server 12. The query request is used to query a vacant parking space in the parking lot.

Step S1305: The server 12 sends parking space information to the terminal device. The parking space information indicates whether each parking space in the parking lot is occupied by a vehicle.

In an example, after the terminal device establishes the communication connection to the server 12, the terminal device sends a query request to the server 12 to query whether there is a vacant parking space. After receiving the query request, the server 12 first obtains images shot by the parking space cameras 112 at a current moment, detects whether there is a vehicle parked in each parking space in the parking lot at the current moment, and classifies parking spaces into parking spaces that are occupied by vehicles (for example, occupied parking spaces) and parking spaces that are not occupied by vehicles (for example, vacant parking spaces); and then sets, based on information indicating that a parking space is reserved by another driver, the parking space that is in the vacant parking spaces and that is reserved by the another driver as a reserved parking space.

After determining that each parking space is one type of the occupied parking space, the vacant parking space, or the reserved parking space, the server 12 counts quantities of three types of parking spaces, and then sends the quantities to the server 12.

Optionally, after determining a type of each parking space, the server 12 virtualizes a virtual parking lot map with reference to the stored parking lot map, so that in the parking spaces of the parking lot, the occupied parking spaces are displayed in one color, the vacant parking spaces are displayed in one color, and reserved parking spaces are displayed in another color. Then, the virtual parking lot map is sent to the terminal device, and the terminal device displays the virtual parking lot map on a screen after receiving the virtual parking lot map, so that the driver can intuitively see the type of each parking space in the parking lot and a location of each type of parking space.

Step S1306: The terminal device sends a reservation request to the server 12. The reservation request is used to select a vacant parking space in the parking lot to park the target vehicle.

In an example, after the terminal device receives the parking space information, if it indicates that there is a vacant parking space in the parking lot, the driver may perform reservation; or if it indicates that there is no vacant parking space in the parking lot, the driver cannot perform reservation.

Step S1307: After determining a target parking space, the server 12 sends feedback information to the terminal device. The target parking space is a vacant parking space selected for parking the target vehicle, and the feedback information is information indicating that reservation of a vacant parking space succeeds.

In an example, a manner in which the server 12 determines the target parking space may be determined based on the location information of the vehicle, or may be selected by the driver. In an example of a possible implementation, the server 12 obtains images shot by the road cameras 111 at a current moment, then identifies the target vehicle from the images based on the vehicle information of the target vehicle, identifies another sign or object in the images, and compares the another sign or object with the high-definition map of the parking lot, to determine a location of the target vehicle relative to the parking lot. After determining the location of the target vehicle relative to the parking lot, the server 12 selects, based on a principle of proximity, a vacant parking space that is in the parking lot and that is closest to the target vehicle as the target parking space.

In an example of a possible implementation, after receiving the parking space information, the terminal device displays the virtual parking lot map on the screen. If there is no vacant parking space in the virtual parking lot map, the driver cannot perform parking space reservation by tapping an interface, or words, for example, "Cannot reserve a parking space", are displayed on the interface, to remind the driver that reservation cannot be performed. If there is a vacant parking space in the virtual parking lot map, the driver may select the vacant parking space as a reserved parking space of the vehicle by tapping an image of the vacant parking space on the screen, and then send the selected target parking space to the server 12.

Optionally, if each parking space in the parking lot has a display 132 configured to indicate a parking space state, after determining the target parking space, the server 12 converts a state indicated by the display 132 on the target parking space from a vacant state to a reserved state, to remind a vehicle in the parking lot that the parking space is pre-reserved by another driver, thereby avoiding occupation of the target parking space by another vehicle.

Step S1308: The server 12 determines location information of the target vehicle based on the vehicle information, and then generates a navigation route based on the location information of the target vehicle and the location information of the target parking space.

In an example, in this application, when the parking lot is constructed, the high-definition map of the parking lot is stored in the server 12. Therefore, after obtaining the images shot by the road cameras 111, the server 12 performs identification on vehicles in the obtained images based on the vehicle information of the target vehicle. If the target vehicle is identified in the obtained images, the server 12 calculates the location of the target vehicle through calibration of the images shot by the cameras 111 and the high-definition map of the parking lot. After obtaining the location of the target vehicle in the parking lot and the location of the target parking space, the server 12 plans, with reference to the stored parking lot map, a shortest road for the target vehicle to reach the target parking space as the navigation route.

For example, when shooting an image, the camera 111 uses a camera calibration principle, first converts a photographed scenario from a world coordinate system into a camera coordinate system, and then converts an obtained scenario from the camera coordinate system to an image coordinate system, to obtain an image after distortion correction. The processor 12 may include at least one processor and determines the location of the target vehicle based on the image obtained after distortion correction and with reference to a coordinate system relationship of the target vehicle in the corrected image.

Step S1309: The server 12 sends the navigation route to the terminal device.

Step S1310: The terminal device displays the navigation route on a screen.

In an example, the server 12 sends the navigation route to the terminal device. After receiving the navigation route, the terminal device displays the navigation route on the screen, so that the driver drives the target vehicle to the target parking space based on the navigation route.

Optionally, the terminal device may receive a plurality of navigation routes at the same time, and then display a route list on the screen. The driver may select a navigation route from the route list based on a wish of the driver, and the terminal device presents the navigation route on the screen.

Generally, an area of the parking lot is small, and a quantity of passable roads is small. Therefore, the server 12 sends only one navigation route to the terminal device at a time. This solution basically meets requirements of most drivers for performing navigation. However, when the driver subjectively wishes to abandon the current navigation route or the server 12 cannot detect that the current navigation route is impassable because of an obstacle, the driver may choose to abandon the current navigation route and request the server 12 to replan a navigation route. After receiving an instruction of replanning a navigation route, the server 12 replans a navigation route different from the previous route with reference to the previously recommended navigation route, and then sends the navigation route to the terminal device.

In addition, after sending the navigation route to the terminal device, the server 12 continues to control the road camera 111 on the navigation route and the parking space camera 112 that monitors the target parking space to shoot, to detect, for example, a real-time location of the target vehicle, whether there is an obstacle on the navigation route, whether the target vehicle deviates from the navigation route, or whether the target parking space is occupied by another vehicle. If the location of the target vehicle changes but is still on the navigation route, the location information of the target vehicle is updated, and then updated location information of the target vehicle is sent to the terminal device. The terminal device may update the location of the target vehicle in real time, so that the driver clearly learns a real-time location relationship between the target vehicle and the target parking space. If it is detected that there is an obstacle on the navigation route or the target vehicle deviates from the navigation route, the server 12 replans a navigation route to the target parking space for the target vehicle. If it is detected that the target parking space is forcibly occupied by another vehicle, the server 12 reselects a vacant parking space as the target parking space, and then replans a navigation route for the target vehicle to each the new target parking space.

Optionally, if the target vehicle is an autonomous vehicle, the terminal device may send the navigation route to the target vehicle, and the target vehicle automatically performs navigation, driving, and parking based on the received navigation route, to perform corresponding steps described in FIG. 12.

Optionally, if a human machine interface (HMI) of the target vehicle has a receiving interface, the server 12 or the terminal device may push the navigation route to the target vehicle by using a network, for example, LTE, LTE-V, 5G, or Wi-Fi. The target vehicle displays information about the navigation route on the screen.

In this embodiment of this application, the location information of the target vehicle in the parking lot is obtained by using a camera vision positioning technology, then a vacant target parking space for parking the target vehicle is determined, a navigation route is generated based on the location information of the target vehicle and the location information of the target parking space, and finally the navigation route is pushed to a mobile phone of a user. This resolves a problem of finding a parking space by blindly driving a vehicle in the parking lot, thereby improving operating efficiency of an existing parking lot and user experience. In addition, a safety condition in the parking lot can be predicted, to assist in safe driving of the target vehicle.

Embodiment 3

Figure 14:
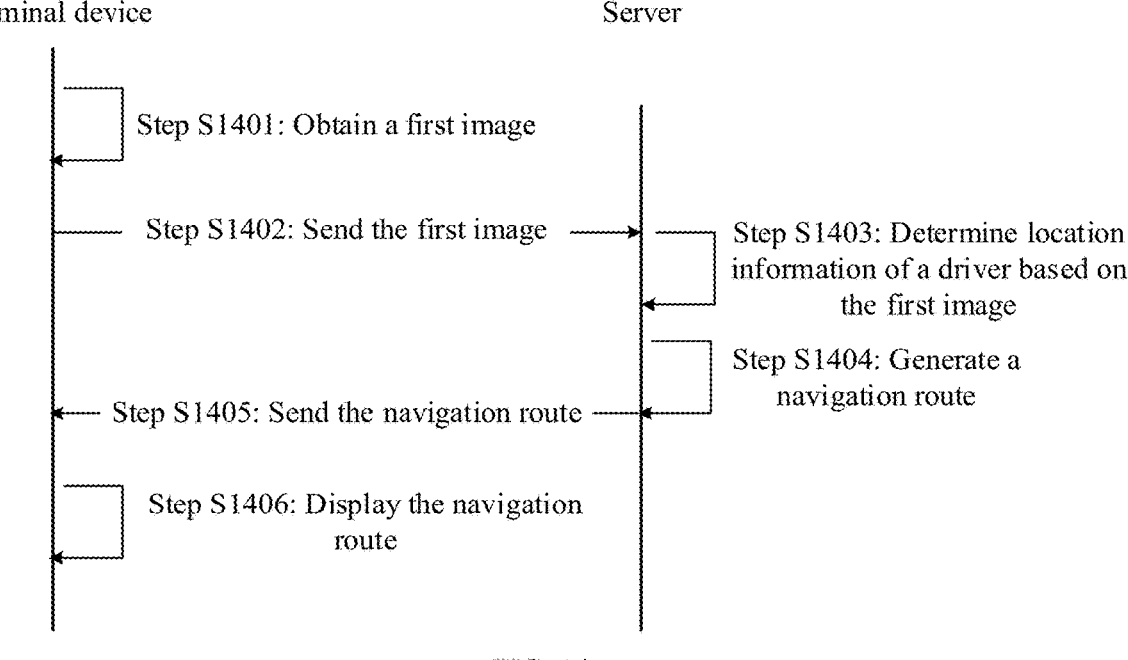
FIG. 14 is a flowchart of an implementation process of a navigation method according to an embodiment of this application.

FIG. 14 is a flowchart of an implementation process of a navigation method according to an embodiment of this application. As shown in FIG. 14, in this application, a terminal device used by a driver is used as an example to describe implementation of a navigation function with the server 12. An implementation process is as follows.

Step S1401: The terminal device obtains a first image. The first image is an image obtained by the driver by photographing any scenario in the parking lot by using a camera on the terminal device.

Step S1402: The terminal device sends the first image to the server 12.

In an example, after entering the parking lot, the driver cannot determine a parking location of a target vehicle. The driver may use the terminal device to photograph an obvious sign or object in the parking lot, for example, a license plate of a vehicle, a road sign, a parking space number, or a wall sign, and after obtaining an image including the obvious sign or object in the parking lot, the server 12 may identify the sign or object, to determine a current location of the driver.

Step S1403: The server 12 determines location information of the driver based on the first image.

In an example, after receiving the image sent by the driver, the server 12 identifies the sign and the object in the image, compares the identified sign or object with information that has been stored in a database of the server 12, such as wall signs and parking space numbers of the parking lot. If comparison succeeds, to be specific, the sign and the object identified in the first image is the same sign or object in the database, the server 12 uses a location of the sign or object as the current location of the driver based on location information that is of the sign and the object and that has been stored in the database.

If the comparison fails, to be specific, the sign and the object identified in the first image do not exist in the database, the server 12 controls the road camera 111 and the parking space camera 112 to shoot, identifies signs and objects included in images shot by the road camera 111 and the parking space camera 112, and compares the signs and the objects with the sign and the object identified in the first image. If the sign and the object identified in the first image occur in the images shot by the road camera 111 and the parking space camera 112, a location of the road camera 111 or the parking space camera 112 is used as the current location of the driver; or if the sign and the object identified in the first image do not occur in the images shot by the road camera 111 and the parking space camera 112, the server 12 sends a re-photographing instruction to the terminal device, and determines the current location of the driver by changing a photographed target, and performing identification and comparison again.

Step S1404: The server 12 generates a navigation route based on parking space information of the target vehicle and the location information of the driver.

In an example, after determining the location information of the driver, the server 12 determines a location of the target vehicle. In this application, a location that is of the target parking space and that is previously determined during navigation may be used as the location of the target vehicle. Alternatively, when being connected to the terminal device, the server 12 may obtain vehicle information based on identity information of the terminal device, identify, by using the vehicle information of the target vehicle, a vehicle in the image shot by the parking space camera 112, to determine the target vehicle, and use a location of a parking space in which the target vehicle is located as the location of the target vehicle. Finally, the server 12 plans, based on the location of the driver and the location of the target vehicle and with reference to the stored parking lot, a route for the driver to reach the target vehicle.

Step S1405: The server 12 sends the navigation route to the server 12.

Step S1406: The terminal device displays the navigation route on a screen.

In this embodiment of this application, after the driver leaves the parking lot, a vehicle finding process is as follows: The driver may scan an obvious sign or object, for example, a parking space sign in the parking lot, by using a mobile phone, to implement self-positioning, so that a path between the driver and a parking location of the target vehicle is generated on the map, to effectively help the driver quickly find the target vehicle anytime and anywhere.

Embodiment 4

Figure 15:
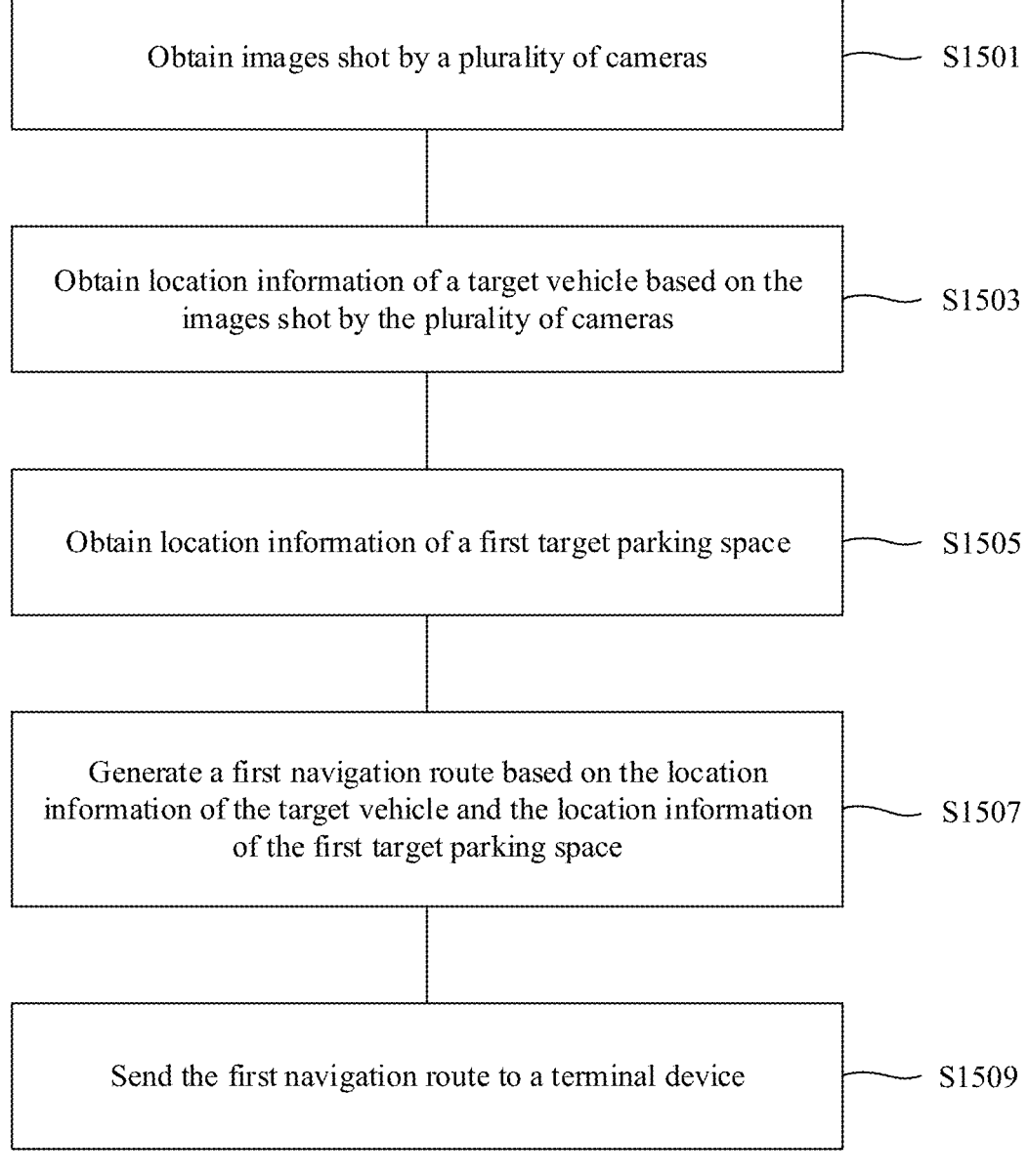
FIG. 15 is a flowchart of a navigation method according to an embodiment of this application.

FIG. 15 is a flowchart of a navigation method according to an embodiment of this application. As shown in FIG. 15, in this application, an implementation process of the navigation method in this application is described from a perspective of a server.

Step S1501: Obtain images shot by a plurality of cameras. The plurality of cameras are all the road cameras disposed in the parking lot.

Step S1503: Obtain location information of a target vehicle based on the images shot by the plurality of cameras.

In an example, after obtaining images shot by the road cameras 111, the server 12 performs identification on vehicles in the obtained images based on vehicle information of the target vehicle. If the target vehicle is identified in the obtained images, the server 12 calculates a location of the target vehicle through calibration of the images shot by the cameras 111 and the high-definition map of the parking lot.

For example, when shooting an image, the camera 111 uses a camera calibration principle, first converts a photographed scenario from a world coordinate system into a camera coordinate system, and then converts an obtained scenario from the camera coordinate system to an image coordinate system, to obtain an image after distortion correction. The processor 12 may include at least one processor and determines the location of the target vehicle based on the image after distortion correction and with reference to a coordinate system relationship of the target vehicle in the corrected image.

Step S1505: Obtain location information of a first target parking space.

In an example, after determining the target vehicle, the processor 12 may include at least one processor and determines a target parking space based on a parking space reserved for the target vehicle. There is a plurality of manners for a user to reserve a target parking space. The user may automatically select a vacant parking space closest to the user as the target parking space based on the location information of the target vehicle, or the user may determine the target parking space based on a subjective selection.

For example, the server 12 sends parking space information to the terminal device. The parking space information is about all vacant parking spaces in the parking lot. After receiving the parking space information, the terminal device displays the vacant parking spaces in the parking lot on a screen for the user to choose. After the user selects a parking space by tapping the screen, a first instruction is sent to the server 12, to instruct a parking space that is selected by the user from all the vacant parking spaces in the parking lot as the target parking space.

Step S1507: Generate a first navigation route based on the location information of the target vehicle and the location information of the first target parking space. The first navigation route is a navigation route for the target vehicle to reach the first target parking space.

Step S1509: Send the first navigation route to the terminal device.

In this application, after obtaining the location of the target vehicle and determining the target parking space for the user of the target vehicle by using the cameras deployed in the parking lot, the server generates the navigation route based on the location of the target vehicle and the location of the target parking space, so that a parking space can be quickly found in the parking lot for the vehicle. This resolves a problem of finding a parking space by blindly driving a vehicle in the parking lot, thereby improving operating efficiency of an existing parking lot and user experience.

Figure 16:
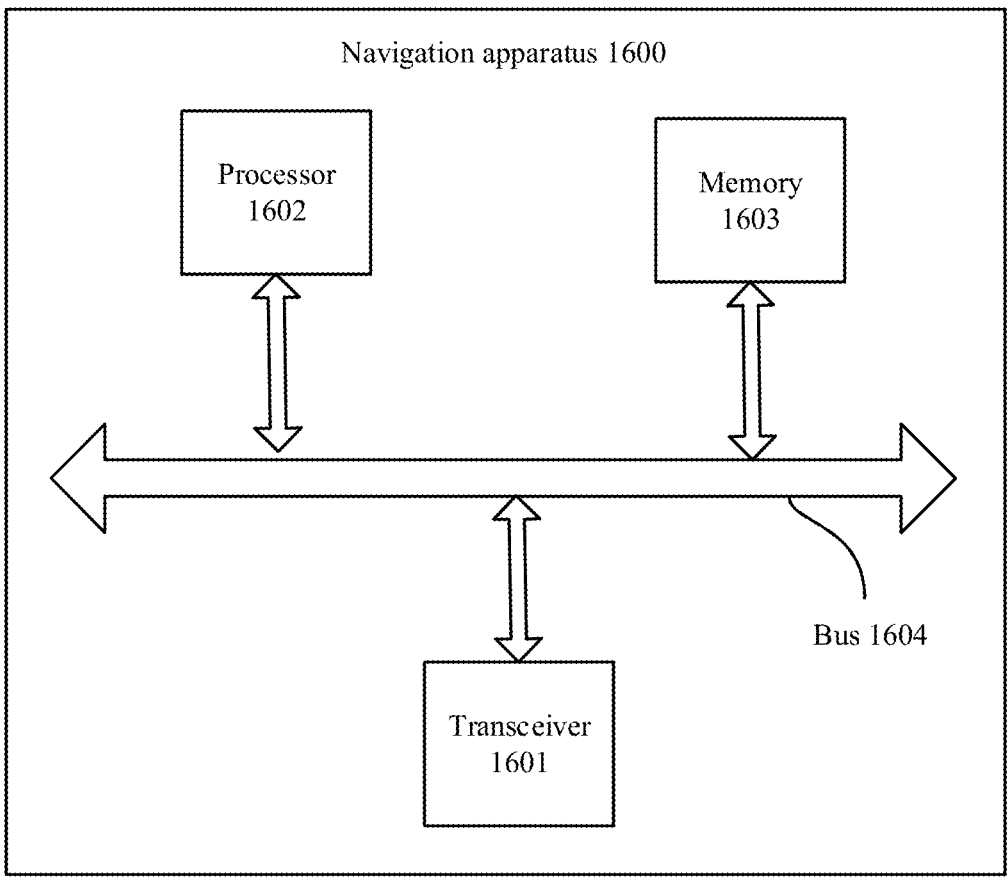
FIG. 16 is a schematic diagram of a structure of a navigation apparatus according to an embodiment of this application.

FIG. 16 is a schematic diagram of a structure of a navigation apparatus according to an embodiment of the present application. FIG. 16 shows a navigation apparatus 1600. The navigation apparatus 1600 includes a transceiver 1601, at least one processor 1602, a memory 1603, and a bus 1604. The transceiver 1601, the processor 1602, and the memory 1603 in the navigation apparatus 1600 may establish a communication connection by using the bus 1604.

The transceiver 1601 may be a P5 interface, an optical fiber interface, or the like for wired communication, or may be a 2G/3G/4G/5G communications module, a Wi-Fi module, or the like.

The processor 1602 may be a CPU, a cloud server, or the like.

The memory 1603 may include a volatile memory, for example, a random-access memory (RAM); or the memory may include a non-volatile memory (non-volatile memory), for example, a read-only memory (ROM), a flash memory, a hard disk drive (HDD), or a solid state drive (SSD); or the memory 804 may include a combination of the foregoing types of memories.

The navigation methods provided in the foregoing embodiments are performed by the navigation apparatus 1600. Data such as an image and a high-definition map are stored in the memory 1603. In addition, the memory 1603 is further configured to store program instructions or the like corresponding to the navigation method described in the foregoing embodiments. An implementation is as follows.

The transceiver 1601 is configured to obtain images shot by a plurality of cameras, where the plurality of cameras are disposed in a parking lot; the processor 1602 obtains location information of a target vehicle based on the images shot by the plurality of cameras; obtains location information of a first target parking space, where the first target parking space is a vacant parking space for parking the target vehicle; and generates a first navigation route based on the location information of the target vehicle and the location information of the first target parking space, where the first navigation route is a navigation route for the target vehicle to reach the first target parking space; and the transceiver 1601 is further configured to send the first navigation route to a terminal device, where the terminal device is a navigation device of a user of the target vehicle.

In an implementation, the processor 1602 is further configured to set a state of the first target parking space from a vacant state to a non-vacant state.

In an implementation, the transceiver 1601 is configured to receive vehicle information of the target vehicle sent by the terminal device; and the processor 1602 is further configured to identify, based on the vehicle information of the target vehicle, a first image from the images shot by the plurality of cameras, where the first image includes the target vehicle; and determine the location information of the target vehicle by using the first image and a stored parking lot map.

In an implementation, the transceiver 1601 is further configured to send parking space information to the terminal device, where the parking space information is about all vacant parking spaces in the parking lot; and receive a first instruction sent by the terminal device, where the first instruction indicates the first target parking space selected by the user from all the vacant parking spaces in the parking lot.

In an implementation, the transceiver 1601 is further configured to receive a second instruction sent by the terminal device, where the second instruction indicates that the user reselects a vacant parking space for parking; the processor 1602 is further configured to obtain location information of a second target parking space, where the second target parking space is a vacant parking space for parking the target vehicle other than the first target parking space; and generate a second navigation route based on the location information of the target vehicle and the location information of the second target parking space, where the second navigation route is a navigation route for the target vehicle to reach the second target parking space; and the transceiver 1601 is further configured to send the second navigation route to the terminal device.

In an implementation, the processor 1602 is further configured to detect whether there is an obstacle on a road in an image shot by a second camera, where the second camera is a camera in the first navigation route; and when it is detected that there is an obstacle on the road in the image shot by the second camera, generate a third navigation route based on the location information of the target vehicle, the location information of the first target vehicle space, and location information of the road in the image shot by the second camera, where the third navigation route is different from the first navigation route.

In an implementation, the processor 1602 is configured to detect, by using a disparity depth of field principle, whether there is an object on the road in the image shot by the second camera; when there is an object on the road in the image shot by the second camera, identify whether the object is a pedestrian or another vehicle; and when the object is not a pedestrian or another vehicle, determine that the object is an obstacle.

In an implementation, the transceiver 1601 is further configured to receive a third instruction sent by the terminal device, where the third instruction indicates that the user searches for the target vehicle parked in the first target parking space; the processor 1602 is further configured to determine location information of the user; and generate a fourth navigation route based on the location information of the user and the location information of the first target parking space, where the third navigation route is a navigation route for the user to reach the first target parking space; and the transceiver is further configured to send the fourth navigation route to the terminal device.

In an implementation, the transceiver 1601 is further configured to receive a second image sent by the terminal device, where the second image is an image obtained by the user by photographing a scenario in the parking lot by using the terminal device; and the processor 1602 is further configured to compare the scenario included in the second image with the parking lot map stored in the memory, to determine a location of the user.

The present application provides a computer-readable storage medium, where the computer-readable storage medium stores a computer program, and when the computer program is executed in a computer, the computer is enabled to perform any one of the foregoing methods.

The present application provides a computing device, including a memory and a processor, where the memory stores executable code, and when executing the executable code, the processor implements any one of the foregoing methods.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD), or a digital versatile disc (DVD)), a smart card, or a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

In the foregoing embodiment, the navigation apparatus 1600 in FIG. 16 may be implemented in whole or in part by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It may be clearly understood by a person skilled in the art that for the purpose of convenient and brief description, for a detailed working process of the described system, apparatus, and unit, refer to a corresponding process in the foregoing method embodiments. Details are not described herein.

In the several embodiments provided in this application, it should be understood that the disclosed system, apparatus, and method may be implemented in another manner. For example, the apparatus embodiments described above are only examples. For example, division into the units is only logical function division, and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

When the functions are implemented in a form of a software functional unit and sold or used as an independent product, the functions may be stored in a computer-readable storage medium. Based on such an understanding, the technical solutions of the embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or an access network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are implementations of the embodiments of this application, and are not intended to limit the protection scope of the embodiments of this application. Any variation or replacement readily figured out by a person skilled in the art within the technical scope disclosed in the embodiments of this application shall fall within the protection scope of the embodiments of this application.

What is claimed is:

1. A navigation method, comprising:
obtaining images from a plurality of cameras that are disposed in a parking lot;
obtaining first location information of a target vehicle based on the images;
obtaining second location information of a first target parking space in the parking lot, wherein the first target parking space is a vacant parking space;
setting a state of the first target parking space from a vacant state to a non-vacant state;
generating a first navigation route based on the first location information and the second location information, wherein the first navigation route is a navigation route for the target vehicle to reach the first target parking space;
sending the first navigation route to a terminal device to permit the terminal device to send the first navigation route to the target vehicle for automatically performing navigation to the first target parking space, wherein the terminal device is a navigation device of a user of the target vehicle;

receiving an image from a first camera of the cameras, wherein the first camera is a camera in the first navigation route and is mounted on a center line of a road to continuously shoot at a fixed angle to obtain a continuously fixed image;
detecting, using a disparity depth-of-field, whether the road in the image contains an object by:
controlling the first camera to continuously shoot at the fixed angle to obtain the continuously fixed image;
performing rasterization on the continuously fixed image to obtain a rasterized image;
converting the rasterized image into a rasterized image depth;
calculating disparity data for an area of the rasterized image depth, wherein the disparity data comprises depth information of pixel-level difference between two stereo images; and
detecting, for the area of the rasterized image depth and based on the disparity data, whether the road in the image contains the object.

2. The navigation method of claim 1, wherein obtaining the first location information further comprises:
receiving, from the terminal device, vehicle information of the target vehicle;
identifying, based on the vehicle information, a first image from the images, wherein the first image comprises the target vehicle; and
determining the first location information using the first image and a parking lot map.

3. The navigation method of claim 1, wherein the first target parking space is the vacant parking space and is closest to the target vehicle.

4. The navigation method of claim 1, wherein obtaining the second location information comprises:
sending parking space information to the terminal device, wherein the parking space information includes all vacant parking spaces in the parking lot; and
receiving, from the terminal device, a first instruction that indicates a selection of the first target parking space from all of the vacant parking spaces in the parking lot.

5. The navigation method of claim 1, further comprising:
receiving, from the terminal device, a second instruction from the terminal device, wherein the second instruction indicates a selection of a second vacant parking space for parking;
obtaining third location information of a second target parking space, wherein the second target parking space is another vacant parking space for parking the target vehicle other than the first target parking space;
generating a second navigation route based on the first location information and the third location information, wherein the second navigation route is a navigation route for the target vehicle to reach the second target parking space; and
sending the second navigation route to the terminal device.

6. The navigation method of claim 1, further comprising generating a third navigation route based on the first location information of the target vehicle on the road in the image, the second location information of the target vehicle on the road in the image, and third location information of the target vehicle on the road in the image from the first camera.

7. The navigation method of claim 6, wherein the detecting comprises:
identifying whether the object corresponds to a pedestrian or another vehicle when there is the object on the road in the image; and determining that the object is an obstacle when the object is not the pedestrian or the other vehicle.

8. The navigation method of claim 1, further comprising:

receiving, from the terminal device, a third instruction that indicates a search for the target vehicle in the first target parking space;

determining fourth location information of the user;

generating a fourth navigation route based on the fourth location information and the second location information, wherein the fourth navigation route is a navigation route for the user to reach the first target parking space; and sending the fourth navigation route to the terminal device.

9. The navigation method of claim 8, wherein determining the fourth location information comprises:

receiving, from the terminal device, a second image comprising a scenario in the parking lot, wherein the second image is based on photographing the scenario in the parking lot using the terminal device;

comparing the scenario with a parking lot map; and determining the fourth location information based on the comparing.

10. A navigation apparatus, comprising:

a memory configured to store executable instructions; and at least one processor coupled to the memory and configured to execute the executable instructions to cause the navigation apparatus to:

obtain images from a plurality of cameras that are disposed in a parking lot;

obtain first location information of a target vehicle based on the images;

obtain second location information of a first target parking space in the parking lot, wherein the first target parking space is a vacant parking space;

set a state of the first target parking space from a vacant state to a non-vacant state;

generate a first navigation route based on the first location information and the second location information, wherein the first navigation route is a navigation route for the target vehicle to reach the first target parking space;

send the first navigation route to a terminal device to permit the terminal device to send the first navigation route to the target vehicle for automatically performing navigation of the target vehicle to the first target parking space, wherein the terminal device is a navigation device of a user of the target vehicle;

receive an image from a first camera of the cameras, wherein the first camera is a camera in the first navigation route and is mounted on a center line of a road to continuously shoot at a fixed angle to obtain a continuously fixed image; and detect, using a disparity depth-of-field, whether the road in the image contains an object by:

control the first camera to continuously shoot at the fixed angle to obtain a continuously fixed image;

perform rasterization on the continuously fixed image to obtain a rasterized image;

convert the rasterized image into a rasterized image depth;

calculate disparity data for an area of the rasterized image depth, wherein the disparity data comprises depth information of pixel-level difference between two stereo images; and detect, for the area of the rasterized image depth and based on the disparity data, whether the road in the image contains the object.

11. The navigation apparatus of claim 10, wherein the instructions that when executed by the at least one processor further cause the navigation apparatus to:

receive, from the terminal device, vehicle information of the target vehicle;

identify, based on the vehicle information, a first image from the images, wherein the first image comprises the target vehicle; and determine the first location information using the first image and a parking lot map.

12. The navigation apparatus of claim 10, wherein the first target parking space is the vacant parking space and is closest to the target vehicle.

13. The navigation apparatus of claim 10, wherein the instructions that when executed by the at least one processor further cause the navigation apparatus to:

send parking space information to the terminal device, wherein the parking space information includes all vacant parking spaces in the parking lot; and receive, from the terminal device, a first instruction that indicates a selection of the first target parking space from all of the vacant parking spaces in the parking lot.

14. The navigation apparatus of claim 10, wherein the instructions that when executed by the at least one processor further cause the navigation apparatus to:

receive, from the terminal device, a second instruction that indicates a selection of a second vacant parking space for parking;

obtain a third location information of a second target parking space, wherein the second target parking space is another vacant parking space for parking the target vehicle other than the first target parking space;

generate a second navigation route based on the first location information and the third location information, wherein the second navigation route is a navigation route for the target vehicle to reach the second target parking space; and send the second navigation route to the terminal device.

15. The navigation apparatus of claim 10, wherein the instructions that when executed by the at least one processor further cause the navigation apparatus to generate a third navigation route based on the first location information of the target vehicle on the road in the image, the second location information of the target vehicle on the road in the image, and third location information of the target vehicle on the road in the image from the first camera.

16. The navigation apparatus of claim 15, wherein the instructions that when executed by the at least one processor further cause the navigation apparatus to:

identify whether the object corresponds to a pedestrian or another vehicle when there is the object on the road in the image; and determine that the object is an obstacle when the object is not the pedestrian or the other vehicle.

17. The navigation apparatus of claim 10, wherein the instructions that when executed by the at least one processor further cause the navigation apparatus to:

receive, from the terminal device, a third instruction, that indicates a search for the target vehicle in the first target parking space;

determine fourth location information of the user;

generate a fourth navigation route based on the fourth location information and the second location information, wherein the fourth navigation route is a navigation route for the user to reach the first target parking space; and send the fourth navigation route to the terminal device.

18. A computer program product comprising computer-executable instructions that are stored on a non-transitory computer-readable storage medium and that, when executed by a processor, cause a navigation apparatus to:

obtain images from a plurality of cameras that are disposed in a parking lot;

obtain first location information of a target vehicle based on the images;

obtain second location information of a first target parking space in the parking lot, wherein the first target parking space is a vacant parking space;

set a state of the first target parking space from a vacant state to a non-vacant state;

generate a first navigation route based on the first location information and the second location information, wherein the first navigation route is a navigation route for the target vehicle to reach the first target parking space;

send the first navigation route to a terminal device to permit the terminal device to send the first navigation route to the target vehicle for automatically performing navigation of the target vehicle to the first target parking space, wherein the terminal device is a navigation device of a user of the target vehicle;

receive an image from a first camera of the cameras, wherein the first camera is a camera in the first navigation route and is mounted on a center line of a road to continuously shoot at a fixed angle to obtain a continuously fixed image; and detect, using a disparity depth-of-field, whether the road in the image contains an object by:

control the first camera to continuously shoot at the fixed angle to obtain a continuously fixed image;

perform rasterization on the continuously fixed image to obtain a rasterized image;

convert the rasterized image into a rasterized image depth;

calculate disparity data for an area of the rasterized image depth, wherein the disparity data comprises depth information of pixel-level difference between two stereo images; and detect, for the area of the rasterized image depth and based on a sudden change in the disparity data, whether the road in the image contains the object.

19. The computer program product of claim 18, wherein the computer-executable instructions that when executed by the processor further cause the navigation apparatus to:

receive, from the terminal device, vehicle information of the target vehicle;

identify, based on the vehicle information, a first image from the images, wherein the first image comprises the target vehicle; and determine the first location information using the first image and a parking lot map.

20. The computer program product of claim 18, wherein the computer-executable instructions that when executed by the processor further cause the navigation apparatus to:

send parking space information to the terminal device, wherein the parking space information includes all vacant parking spaces in the parking lot; and receive, from the terminal device, a first instruction that indicates a selection of the first target parking space from all of the vacant parking spaces in the parking lot.

* * * * *